US011753983B2

(12) United States Patent
Uppole

(10) Patent No.: US 11,753,983 B2
(45) Date of Patent: Sep. 12, 2023

(54) MULTI-FAN COOLING SYSTEM

(71) Applicant: Komatsu America Corp., Chicago, IL (US)

(72) Inventor: Zachary Charles Uppole, Perkin, IL (US)

(73) Assignee: Komatsu America Corp., Chicago, IL (US)

( * ) Notice: Subject to any disclaimer, the term of this patent is extended or adjusted under 35 U.S.C. 154(b) by 43 days.

(21) Appl. No.: 17/399,238

(22) Filed: Aug. 11, 2021

(65) Prior Publication Data

US 2022/0056832 A1 Feb. 24, 2022

Related U.S. Application Data

(60) Provisional application No. 63/067,741, filed on Aug. 19, 2020.

(51) Int. Cl.
| | |
|---|---|
| *F01P 7/02* | (2006.01) |
| *F01P 5/04* | (2006.01) |
| *F01P 3/18* | (2006.01) |
| *B60L 1/00* | (2006.01) |
| *B60K 7/00* | (2006.01) |

(52) U.S. Cl.
CPC ............. *F01P 5/04* (2013.01); *B60K 7/0007* (2013.01); *B60L 1/003* (2013.01); *F01P 3/18* (2013.01); *B60K 2007/0092* (2013.01); *F01P 2025/13* (2013.01)

(58) Field of Classification Search
CPC ........ F04D 27/004; F04D 25/06; F04D 25/08; B60K 7/0007; B60L 2240/36; B60L 2240/662; F01P 2025/13; F01P 3/18; F01P 2025/50; F01P 1/00; F01P 1/06; F01P 2005/046; F01P 5/04; F01P 2023/08; F01P 2037/00; F01P 2060/06; F01P 2060/00; F01P 2025/08
See application file for complete search history.

(56) References Cited

U.S. PATENT DOCUMENTS

| | | |
|---|---|---|
| 6,401,801 B1 | 6/2002 | Dicke |
| 10,392,018 B1 * | 8/2019 | Rhodes .................... B60L 58/25 |

(Continued)

FOREIGN PATENT DOCUMENTS

| | | | | |
|---|---|---|---|---|
| CN | 101080559 A | * | 11/2007 | ................ F01P 5/04 |
| CN | 208347910 U | * | 1/2019 | |

(Continued)

*Primary Examiner* — George C Jin
*Assistant Examiner* — Teuta B Holbrook
(74) *Attorney, Agent, or Firm* — DLA Piper LLP (US)

(57) ABSTRACT

Cooling systems of a work vehicle that provide targeted cooling, regenerative cooling and/or a combination therein. A cooling system includes plural fans configured to provide airflow across a radiator and a fan controller in communication with the plural fans. The fan controller is configured to receive operating condition data associated with at least one of the radiator and an engine. The fan controller is configured to determine a total target heat rejection value based on the operating condition data; determine a plurality of target fan operation values for the plural fans, based on the total target heat rejection value and the operating condition data; and control operation of the plural fans at plural independent fan speeds based on the plural fan operation values.

17 Claims, 13 Drawing Sheets

(56) References Cited

U.S. PATENT DOCUMENTS

| | | | | |
|---|---|---|---|---|
| 2006/0185626 | A1* | 8/2006 | Allen | F02M 26/28 123/41.31 |
| 2013/0239913 | A1* | 9/2013 | Young | F01P 3/18 123/41.49 |
| 2015/0134163 | A1* | 5/2015 | Carter | B60L 50/72 701/22 |
| 2015/0328992 | A1* | 11/2015 | Amaravadi | B60L 7/22 701/70 |
| 2015/0361864 | A1* | 12/2015 | Wagner | F01P 7/08 165/300 |
| 2018/0045100 | A1* | 2/2018 | Steinmetz | G05B 17/00 |
| 2018/0272871 | A1* | 9/2018 | Takada | B60L 1/003 |
| 2019/0120119 | A1 | 4/2019 | Bourgoin | |
| 2020/0247252 | A1* | 8/2020 | Dudar | B60S 5/02 |

FOREIGN PATENT DOCUMENTS

| | | | | |
|---|---|---|---|---|
| CN | 110486138 A * | 11/2019 | | |
| CN | 112696373 A * | 4/2021 | | F04D 27/004 |
| DE | 102010043084 A1 * | 5/2012 | | F01P 7/048 |
| DE | 102020122411 A1 * | 3/2022 | | |
| JP | 2016-30999 A | 3/2016 | | |
| JP | 2017-198135 A | 11/2017 | | |
| JP | 2019083003 A * | 5/2019 | | G06F 1/20 |
| WO | WO-2008069104 A1 * | 6/2008 | | B60T 5/00 |

* cited by examiner

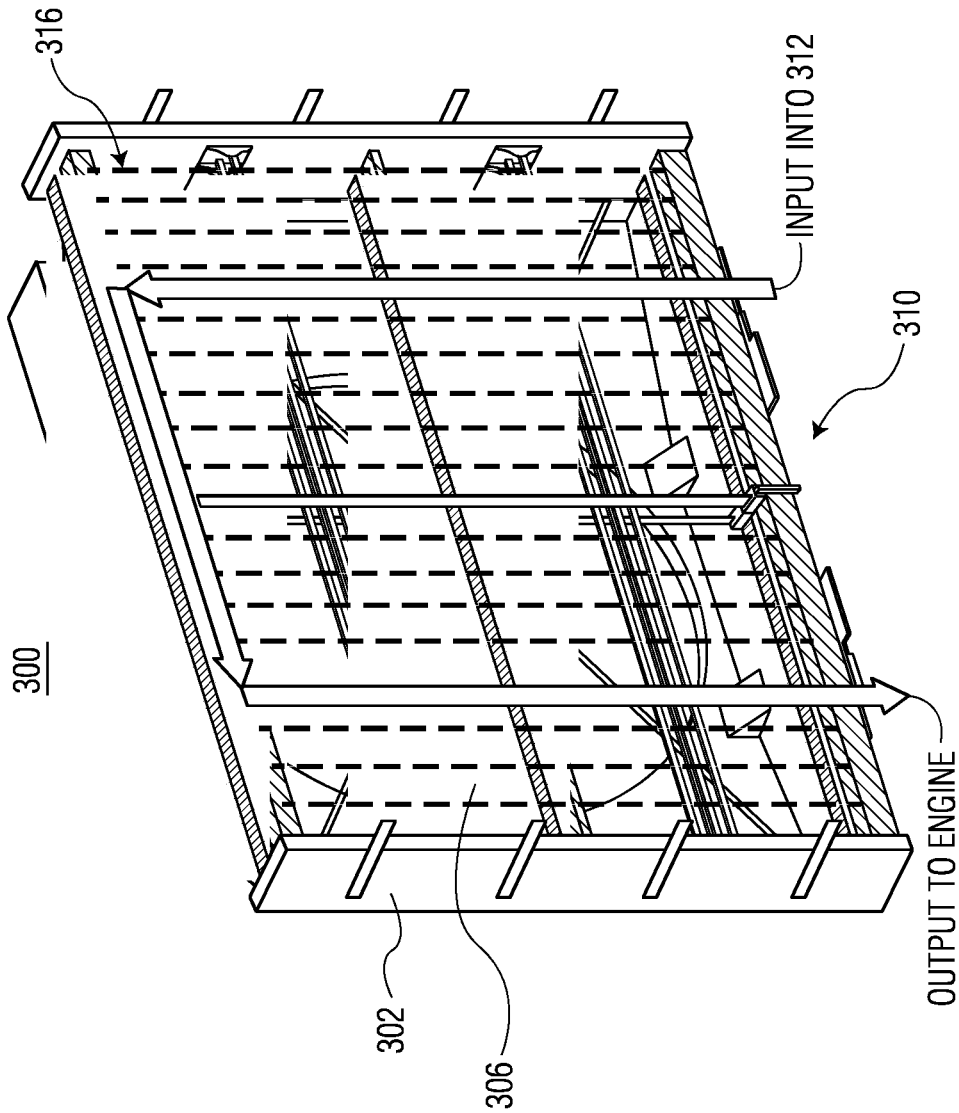
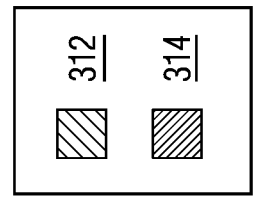
FIG. 3A

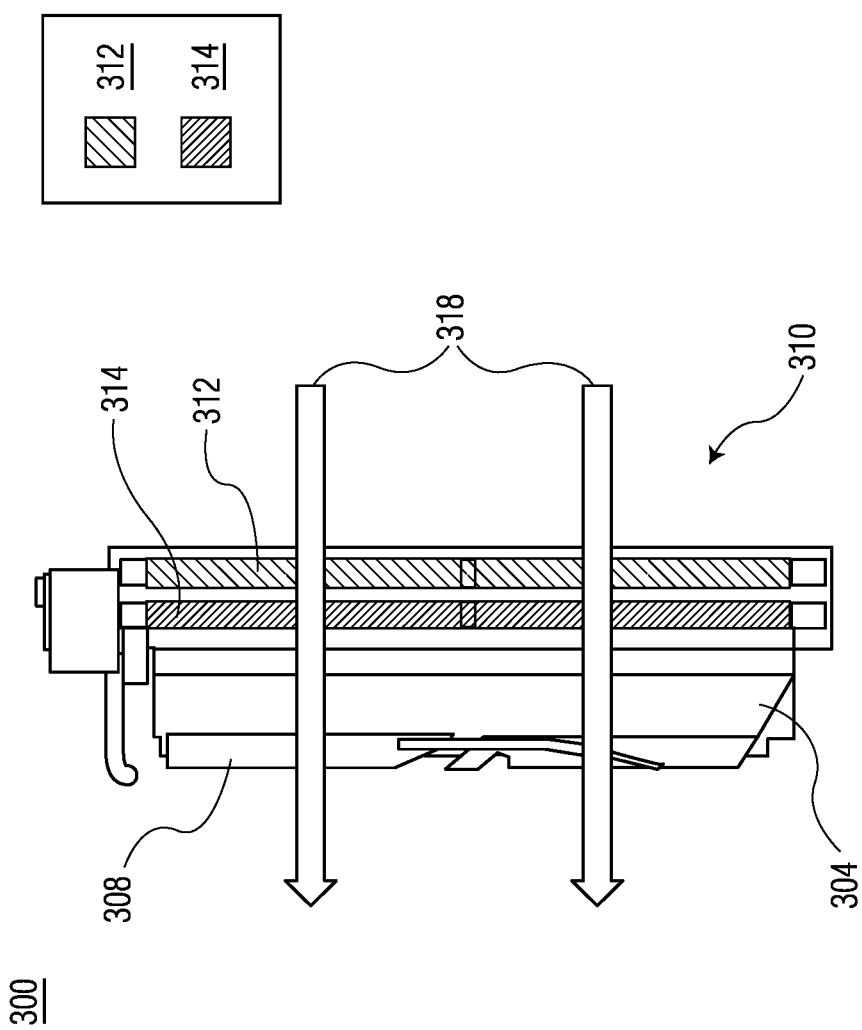

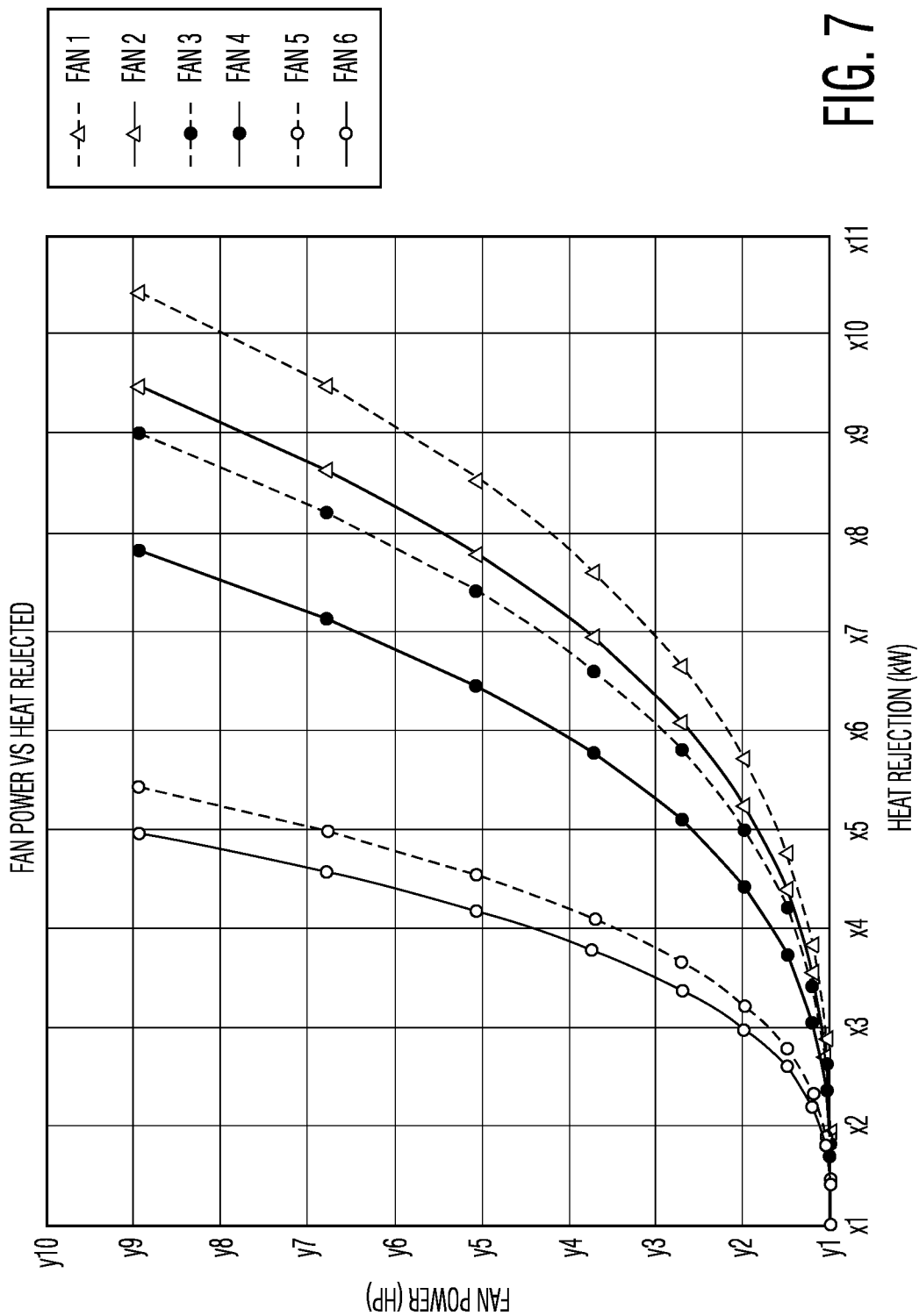

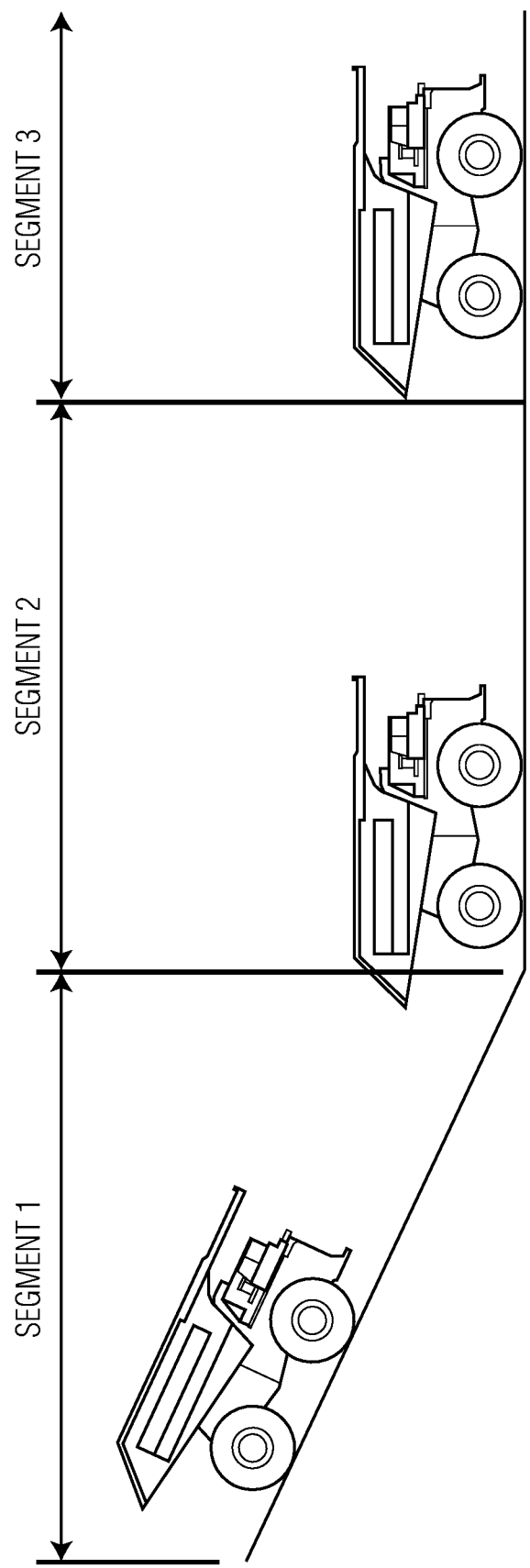

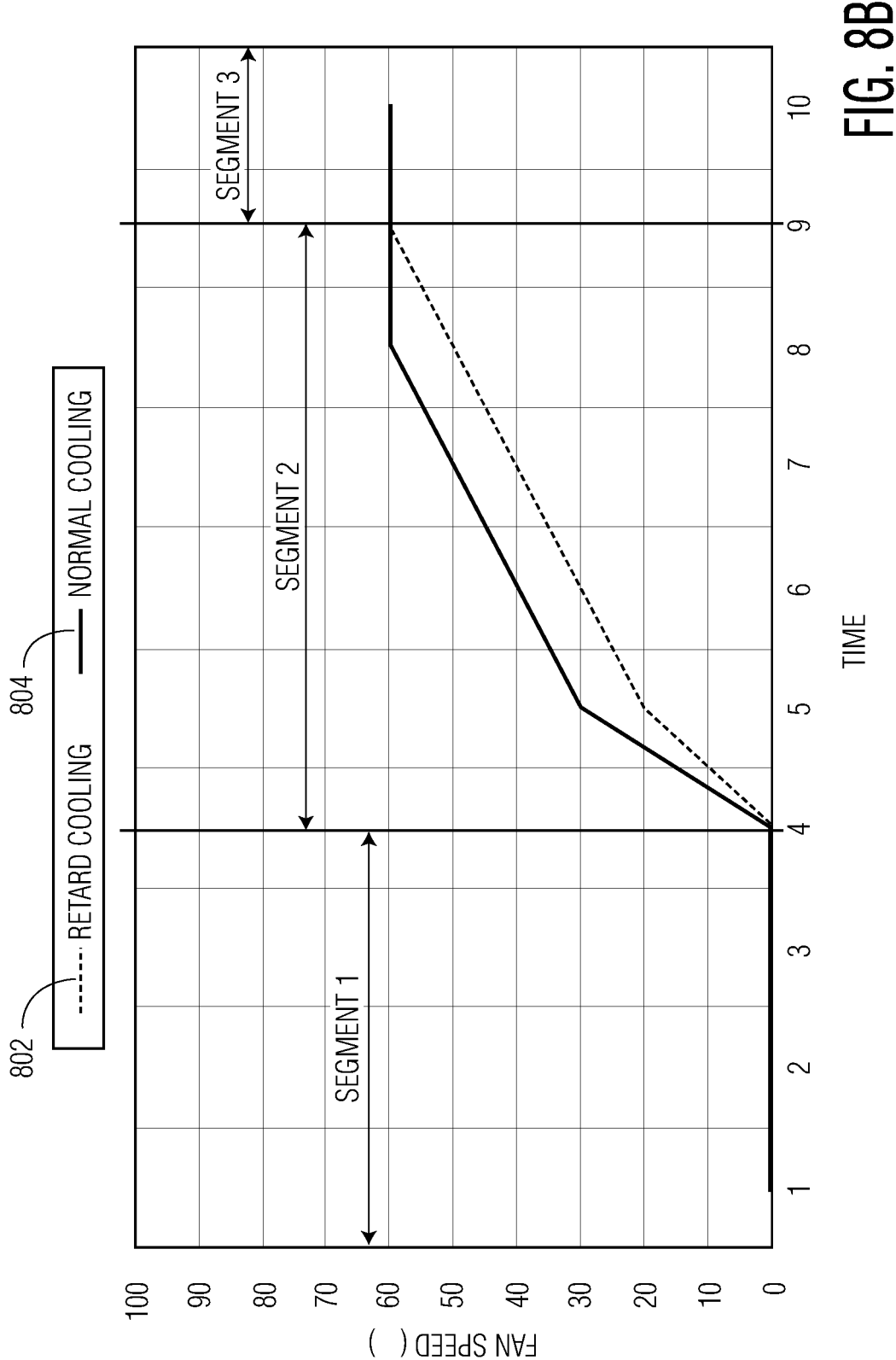

MULTI-FAN COOLING SYSTEM

TECHNICAL FIELD

This disclosure generally relates to improving radiator cooling systems of work vehicles and, in particular, to electrically driven multi-fan radiator cooling systems for controlled and improved targeted cooling and cooling with regeneration energy that is adaptive to operating conditions of a work vehicle.

BACKGROUND

Work vehicles generally use a heat exchanger such as a radiator to cool a cooling fluid that is circulated through an internal combustion engine, and thereby cool the engine. Work vehicles typically include a cooling system configured to generate an airflow passing through the radiator to aid in cooling down the cooling fluid as it passes through the radiator. Conventional work vehicle radiator cooling systems typically use a single fan which is either hydraulically or mechanically driven. However, problems exist with conventional single fan configurations.

One problem with conventional single fan configurations is that a single large fan (e.g., about 7.7 feet by about 7.7 feet) may require significant power to operate. Another problem is that the single fan generally provides limited airflow coverage of the radiator core. Furthermore, single fan systems cannot concentrate airflow on the most efficient regions of the radiator. For example, a single fan may typically produce a higher mass flow near the center of the radiator core (e.g., where the center of the fan is typically located) and lower mass flow at the edges of the radiator core (e.g., where the blades of the fan may not extend).

Another problem arises with the use of mechanically driven radiator fans that are typically driven via a pulley directly connected to the engine crankshaft. In mechanically driven radiator fans, the pulley generally drives a clutch via a belt. The clutch may receive a signal from the engine controller to engage/disengage the fan, which controls the overall fan speed. One disadvantage of mechanically driven radiator fans is that the belt is prone to significant wear, and tends to need frequent servicing (e.g., tension adjustment) or frequent replacement. Another problem with that configuration is that the fan speed response has been shown to be slow in practice. Because of the fan speed response time, using more than one fan becomes cumbersome, and is thus typically not used. Since only one fan can be used, the fan configuration is typically very large for a work vehicle and may consume considerable system power.

Accordingly, there is a need for improved radiator cooling systems for work vehicles.

SUMMARY

I provide cooling systems for work vehicles. The cooling systems may include a plurality of fans configured to provide airflow across a radiator and a fan controller in communication with the plurality of fans. The fan controller may be configured to receive operating condition data associated with at least one of the radiator and an engine. The fan controller may be configured to determine a total target heat rejection value for the plurality of fans based on the operating condition data; determine a plurality of target fan operation values for the plurality of fans, based on the total target heat rejection value and the operating condition data; and control operation of the plurality of fans at a plurality of independent fan speeds based on the plurality of target fan operation values.

My cooling systems may include at least one fan configured to provide airflow across the radiator, a drive system having at least one component configured to generate regeneration energy under one or more vehicle operating modes, a control system configured to communicate with the drive system and a fan controller in communication with the at least one fan, the control system and an engine controller. The fan controller may be configured to receive operating condition data associated with the radiator and work vehicle operation, and a fan speed request from the engine controller. The fan controller may be configured to determine an operating mode of the work vehicle based on the received operating condition data. When the operating mode includes a first mode in which the regeneration energy is available, the fan controller: sets the at least one fan to at least one predetermined fan speed; and operates the at least one fan with the regeneration energy generated by the at least one component according to the at least one predetermined fan speed.

The cooling systems may include at least one fan configured to provide airflow across a radiator, a drive system having at least one component configured to generate regeneration energy under one or more vehicle operating modes, a control system configured to communicate with the drive system; and a fan controller in communication with the at least one fan and the control system. The fan controller may be configured to receive at least one of operating mode data from the control system and operating condition data associated with the at least one component of the drive system. The fan controller may be configured to: determine whether the regeneration energy is currently available, based on one or more of the received operating mode data and the received operating condition data. When it is determined that the regeneration energy is currently available, the fan controller may be configured to: set each of the at least one fan to at least one predetermined fan speed; operate the at least one fan with the regeneration energy from the at least one component according to the at least one predetermined fan speed, and operate the at least one fan with energy from a different power when a regeneration energy condition changes. The regeneration energy condition includes at least one of a change in the operating mode and that the regeneration energy becomes unavailable.

My cooling systems may include a plurality of fans configured to provide airflow across a radiator and a fan controller in communication with the plurality of fans. The fan controller may be configured to receive operating condition data associated with the radiator. The fan controller may be configured to determine a plurality of target fan operation values for the plurality of fans, based on the operating condition data and predetermined fan information for each fan comprising a relationship between heat rejection and at least one of airflow and fan speed. Each target fan operation value may comprise at least one of a target airflow value and a target fan speed value. The fan controller may control operation of the plurality of fans at a plurality of independent fan speeds based on the plurality of target fan operation values.

The cooling system may include at least one fan configured to provide airflow across a radiator, a drive system having at least one component configured to generate regeneration energy under one or more vehicle operating modes, a control system configured to communicate with the drive system and a fan controller in communication with the at least one fan and the control system. The fan controller may be configured to receive operating condition data associated with the radiator and work vehicle operation. The fan controller may be configured to determine an operating mode of the work vehicle based on the received operating condition data. When the operating mode includes a retard mode, the fan controller: sets the at least one fan to at least one predetermined fan speed; and operates the at least one fan with the regeneration energy generated by the at least one component according to the at least one predetermined fan speed.

BRIEF DESCRIPTION OF DRAWINGS

FIGS. 3A and 3B are perspective views of a portion of an example of a cooling system, illustrating flow of a cooling fluid through an example radiator of the cooling system.

FIG. 3C is a cross section of the cooling system shown in FIGS. 3A and 3B.

FIG. 7 is an example of a graph of fan power as a function of heat rejection for a set of fans.

FIG. 8A is an example of a diagram illustrating changes in operating mode for an exemplary work vehicle.

FIG. 8B is an example of a graph illustrating fan speed percentage as a function of time for the changes in operating mode shown in FIG. 8A with pre-cooling and without pre-cooling operation of an example of a cooling system.

DETAILED DESCRIPTION

Figure 1:
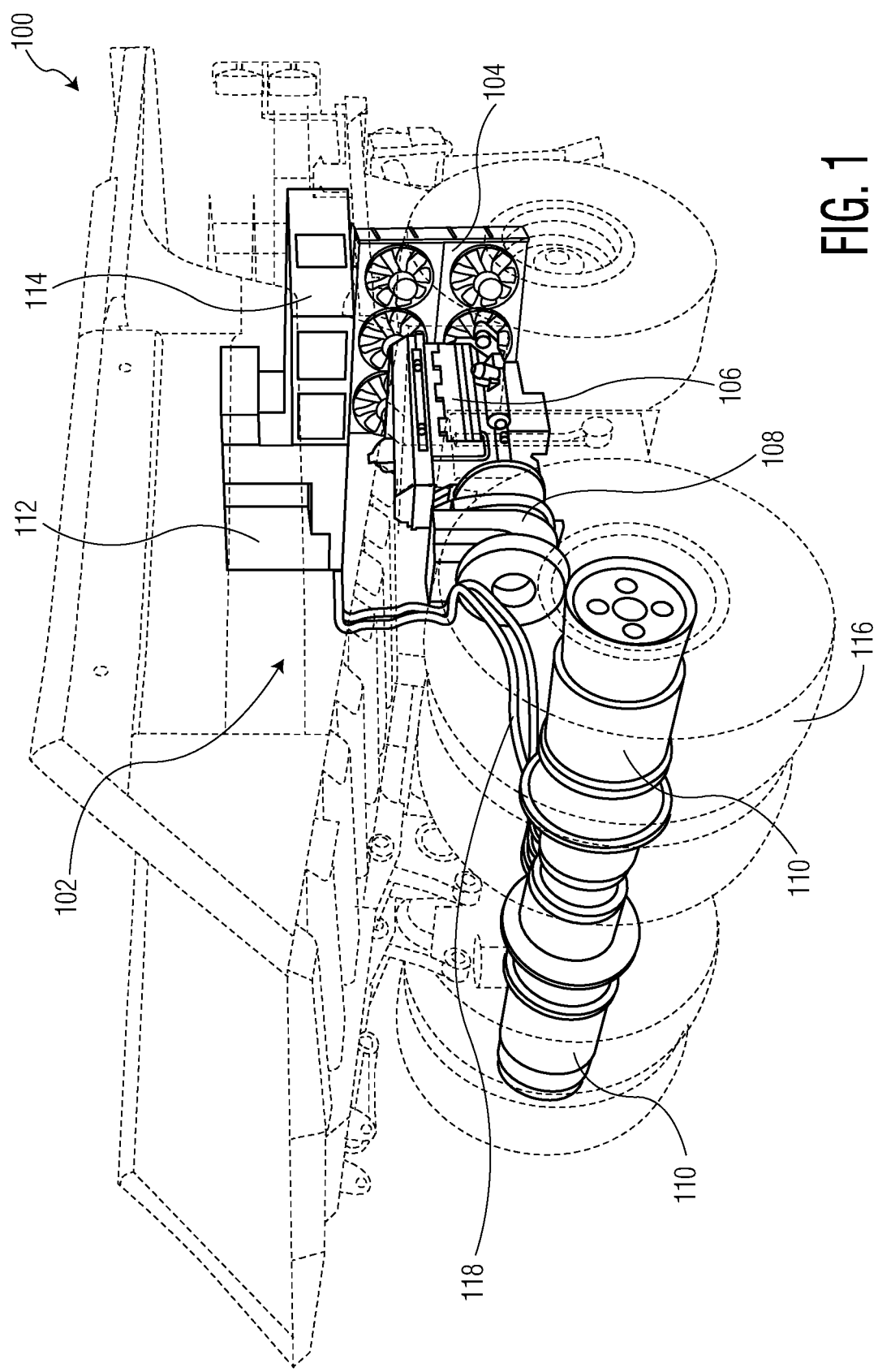
FIG. 1 is a perspective view of an example of a work vehicle illustrating an exemplary drive system.

I provide adaptive cooling systems adapted for use in work vehicles (such as haul trucks, mining vehicles and the like) configured to provide targeted cooling of a radiator using a plurality of fans in which the operation may be adjusted based on operating conditions of the cooling system such as cooling fluid temperature into and/or out of the radiator and/or ambient temperature. In general, the operating conditions may include, without being limited to, one or more of inlet cooling fluid temperature, outlet cooling fluid temperature, ambient temperature, a desired overall fan speed, vehicle operating mode, regeneration energy availability, engine load, engine speed, inclination sensor data, other drive system component information that may be indicative of engine conditions (e.g., load, speed, etc.) and/or regeneration energy availability, and the like. The cooling system may include fan controller configured to determine one or more target airflow values for the plural fans to control and improve heat rejection and minimize power consumption by the plurality of fans. Controlling heat rejection and power consumption reduction may be based on a target heat rejection value (e.g., as desired by the engine controller) and the operating condition data. The adaptive cooling system may also take into consideration hot spots on the radiator that may depend on the operating conditions into the determination of target airflow values. The fan controller may then operate the plural fans at one or more independent fan speeds based on the one or more target airflow values. In this manner, the adaptive cooling system may not only provide additional cooling through the use of and position of multiple fans, but may also provide adjustable cooling operation that changes (and corresponds) in response to different operating conditions.

I also provide adaptive cooling systems adapted for use in work vehicles configured to provide pre-cooling of a radiator using regeneration energy. The regeneration energy may be obtained from one or more components of a drive system that may generate regeneration energy during one or more operating modes (such as a retard mode), that would otherwise be exhausted by the drive system. A fan controller may determine availability of regeneration energy (e.g., in a first operating mode) and cause the regeneration energy to be directed to at least one fan for cooling the radiator during the first operating mode at a single predetermined fan speed (e.g., 100%). When the regeneration energy is no longer available (e.g., in a second operating mode), the fan controller may the direct power to the fan(s) to be received from a traction alternator (or any other suitable power source, such as a power supply device and/or storage device (e.g., at least one battery)), and operate the fan(s) at least one fan speed based on the second operating mode. Operation of the fan(s) during the first operating mode pre-cools the cooling fluid so that during a transition mode between the first and second operating modes, the load to the engine by the fan(s) is reduced. I further provide adaptive cooling systems adapted for use in work vehicles configured to provide both targeted cooling and pre-cooling cooling operations.

In some examples, adaptive cooling systems may include an electrically driven radiator cooling fan array, where the fan speed may be adaptive to work vehicle operating conditions. The use of electrically driven fans provides an advantage over a conventional single mechanically driven fan. In particular, the use of multiple electrically driven fans may provide decreased power consumption of the work vehicle as compared to a conventional single mechanically driven fan.

Adaptive cooling systems may provide additional advantages. For example, an electrically driven cooling setup may permit the use of as many fans as determined to be most efficient. In some examples, the fan speed controller may be provided a data communication signal (e.g., a fan speed request from the engine controller) and may determine the most efficient way to provide cooling to the radiator. In some examples, the fan controller may communicate with a vehicle datalink and detect conditions when the cooling parasitic can be reduced such as in retard mode. The fan controller may control the fans according to a desired level of control. One advantage of my adaptive cooling systems over conventional cooling systems is that the adaptive cooling system may provide a reduced engine parasitic (and thus fuel savings over time). Another advantage of my adaptive cooling systems over conventional cooling systems is that the adaptive cooling system may minimize fuel consumption due to the ability of the adaptive cooling system to provide the most efficient fan speed(s).

In some examples, multi-fan configurations (e.g., of multiple electric fans) may reduce the engine parasitic, and may improve radiator core coverage. By including targeted cooling operation, greater improvements in cooling may be realized (e.g., by targeting the most efficient areas of the radiator). In addition to targeted cooling, the fan controller may detect certain work vehicle operating conditions and modify the fan speed accordingly such as during retarding operation. In general, in operation, the fan controller of the present disclosure may determine the most efficient fan speeds to reduce the parasitic.

Referring to FIG. 1, aspects of a representative example of a work vehicle 100 are illustrated. In particular, FIG. 1 is a perspective view of work vehicle 100 illustrating drive system 102. In some examples, work vehicle 100 may include an electric-drive haul truck. In some examples, work vehicle 100 may be adapted to perform mining activities such as hauling and dumping material from one location to another. Although FIG. 1 illustrates drive system 102 in a haul truck configuration, in some examples, drive system 102 may be adapted for work vehicles of any suitable operation such as, without being limited to, a wheel loader, a motor grader, a truck, a tractor, a dozer, an excavator and the like. Work vehicle 100 may be related to any suitable industry including, but not limited to, construction, mining, transportation, agriculture, manufacturing, forestry, waste management, material handling and the like. In some examples, work vehicle 100 may not include an engine and may, instead, be driven by power from one or more storage devices.

Figure 4:
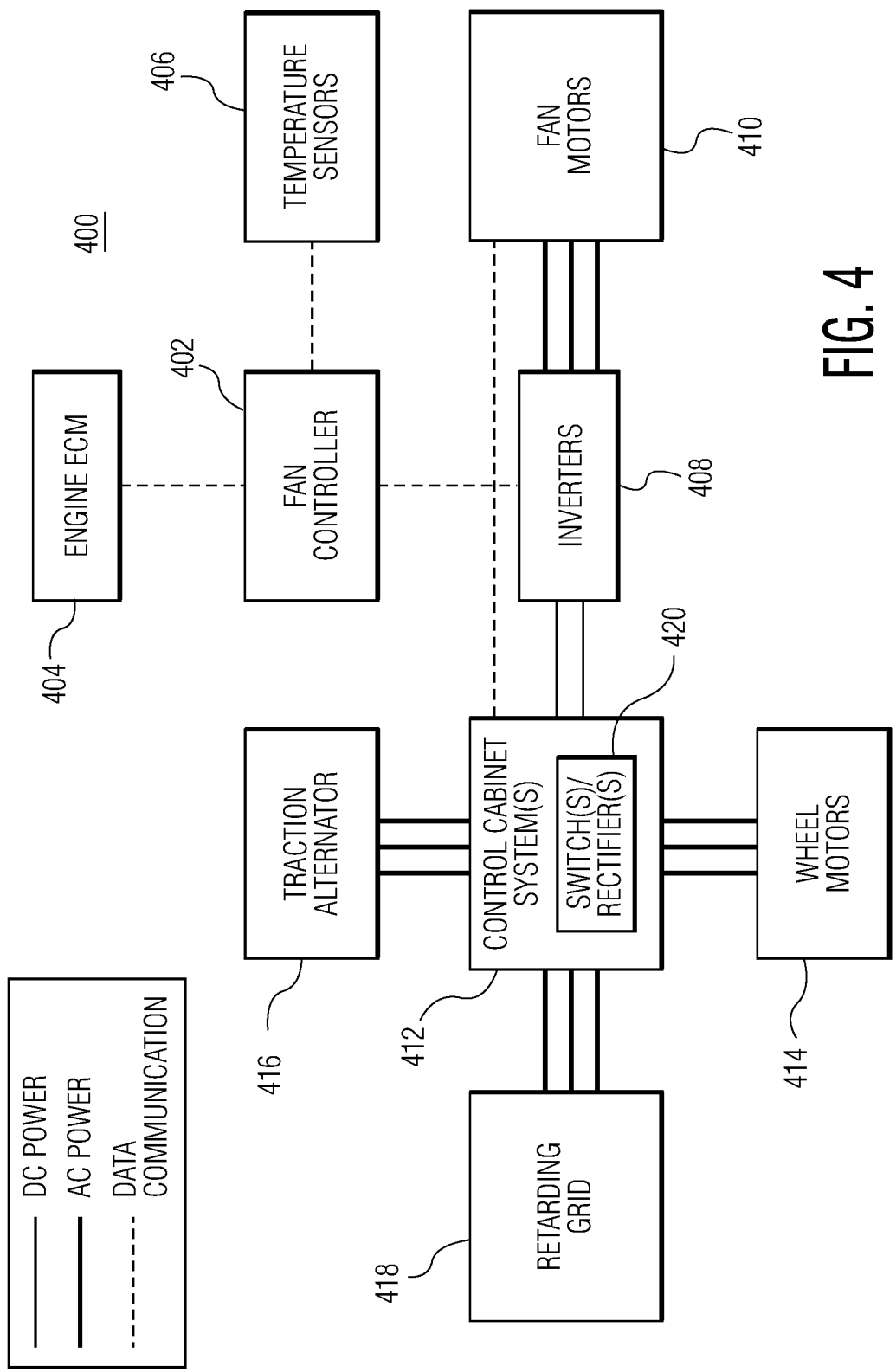
FIG. 4 is a functional block diagram of an example of an adaptive cooling system.

Work vehicle 100 may include drive system 102 for controlling operation of work vehicle 102, including to drive wheels 116. Drive system 102 may include cooling system 104, engine 106, traction alternator 108, wheel motors 110, control cabinet 112 and dynamic retarding grid 114. Components 104-114 of drive system 102 may be in communication with each other via one or more of data communication signals and power signals (e.g., direct current (DC) signals and/or alternating current (AC) signals) provided by one or more connectors such as connectors 118 between traction alternator 108 and wheel motors 110. An example of power and data communication signals is shown in FIG. 4.

Cooling system 104 may be disposed proximate to engine 106 and may be configured to cool engine 106, via circulation of cooling fluid (e.g., coolant) between engine 106 and cooling system 104. Cooling system 104 may include a plurality of fans and a radiator (e.g., fans 202 and radiator 214 shown in FIG. 2) configured to receive hot cooling fluid from engine 106, cool the hot cooling fluid, and provide engine 106 with cooled cooling fluid. Cooling system 104 may also include a fan controller (e.g., fan controller 402 shown in FIG. 4) configured to communicate with engine 106 and control cabinet 112 to adaptively control operation of fans 202.

In general, an array of fans may be configured to provide targeted cooling on regions of the radiator (by directing airflow across the radiator, as shown by arrows 318 in FIG. 3C) via independent control of the multiple fans. Moreover, the targeted cooling by cooling system 104 may be adaptive to operating conditions of work vehicle 100.

In some examples, cooling system 104 may be configured to provide a pre-cooling operation, by using regeneration energy from among the components of drive system 102. In this manner, cooling system 104 may operate the fans without causing an additional load on engine 106. The regeneration energy may include excess energy and/or residual power that would otherwise be dissipated. In some examples, regeneration energy may become available during different operating conditions and/or during a transition between operating conditions of work vehicle 100.

Figure 2:
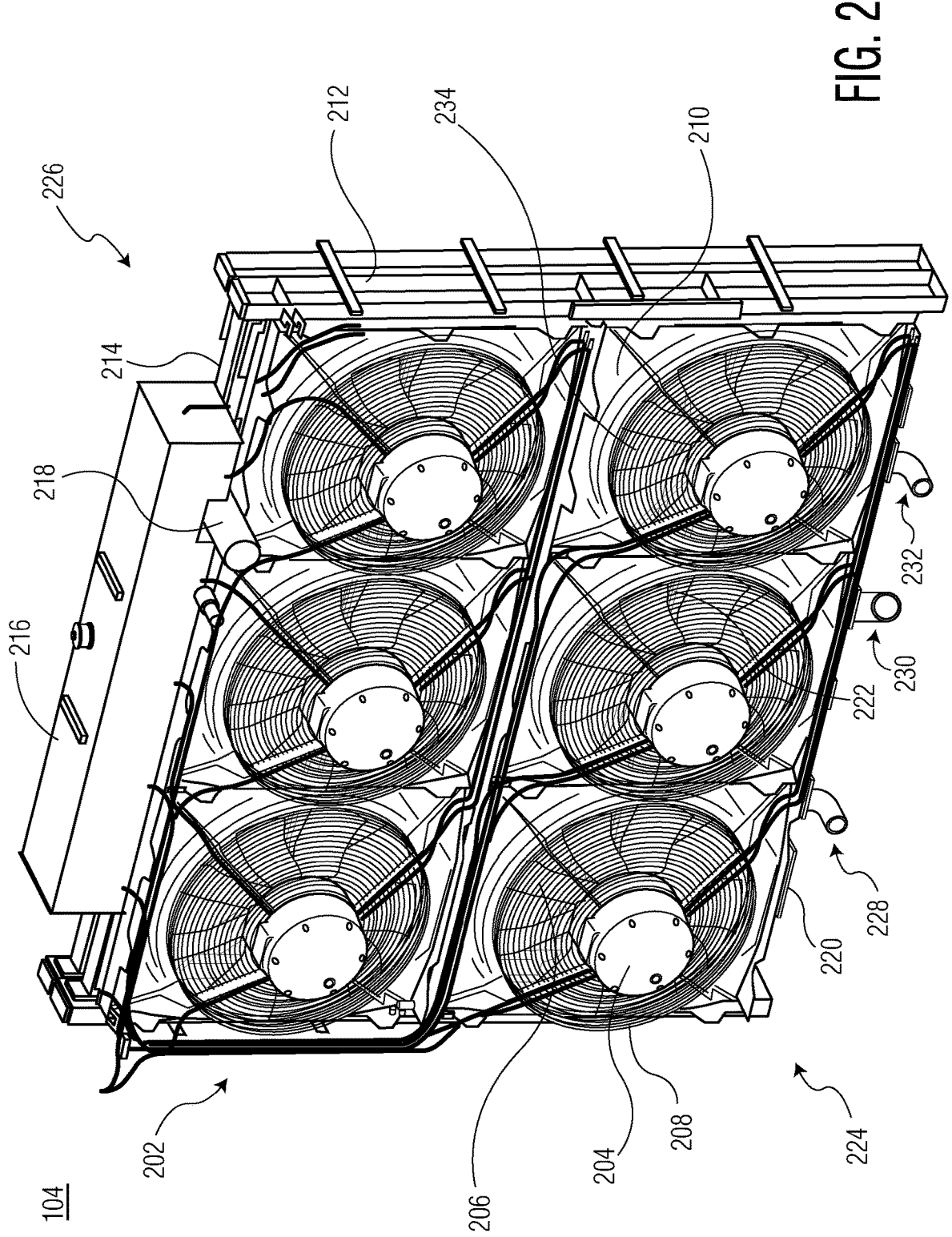
FIG. 2 is a perspective view of an example of a cooling system of the drive system shown in FIG. 1.
Figure 3B:
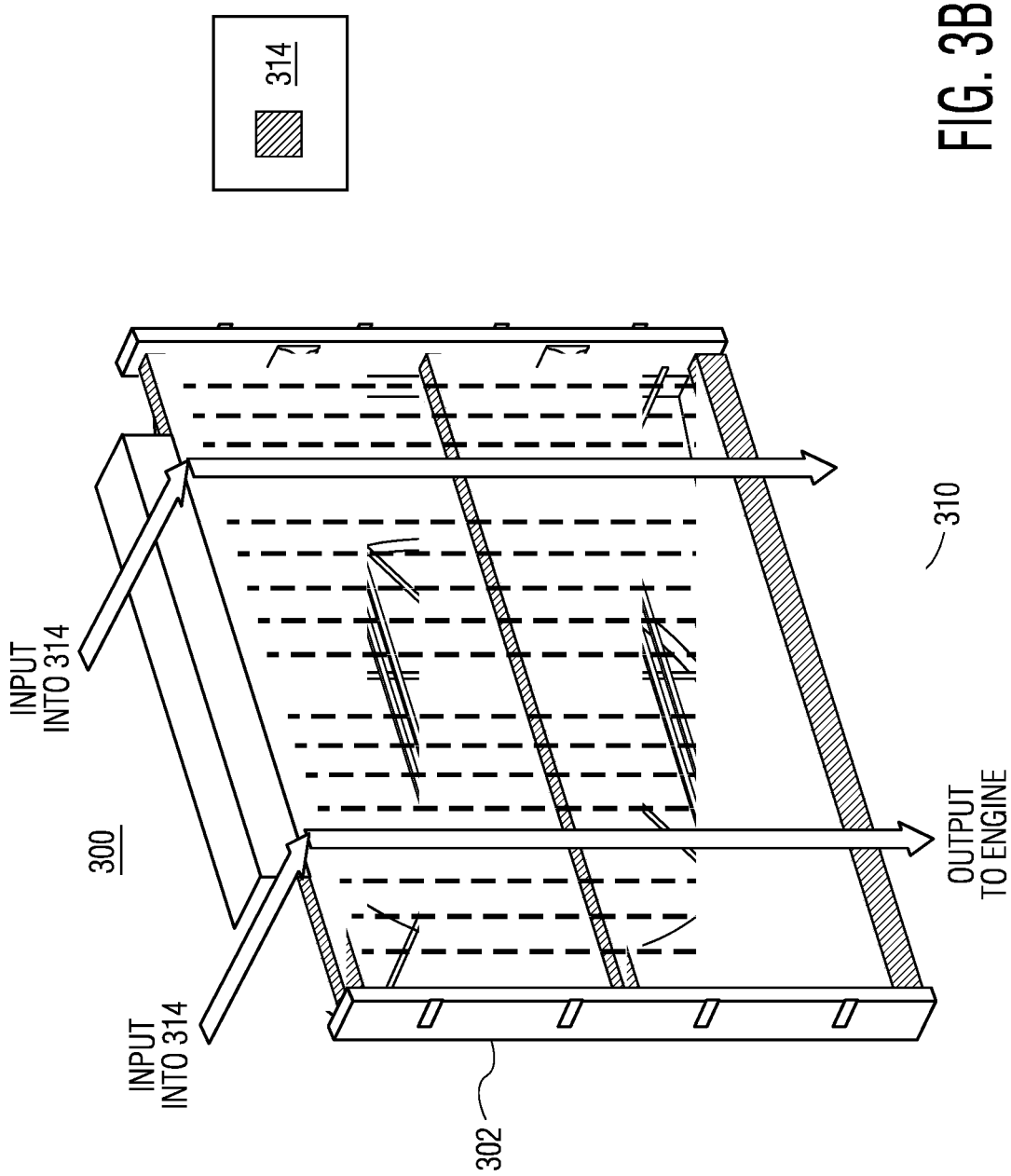

In a non-limiting example, regeneration energy may be obtained from wheel motors 110 during a retard operation of work vehicle 100 (e.g., where wheel motors 110 would otherwise discharge excess energy through retarding grid 114 that may be caused by rotation of wheels 116 due to retard motion such as down an incline). When the regeneration energy is no longer available, cooling system 104 may switch to a targeted cooling operation, using power from traction alternator 108 (or any other suitable power source such as a power supply device and/or a storage device (e.g., at least one battery)). In some examples, cooling system 104 may provide both targeted cooling and pre-cooling operations. In some examples, pre-cooling operation may be available with multi-fan configurations of cooling system 104 (e.g., as shown in FIG. 2) as well as with single fan configurations (e.g., as illustrated in FIGS. 3A-3C).

Cooling system 104 is described further below with respect to FIGS. 2-10.

Engine 106 may be configured to provide motive power to work vehicle 100. In some examples, engine 106 may include an internal combustion engine. In general, engine 106 may be powered by any suitable fuel such as diesel, gasoline, natural gas, hydrogen and the like and/or any combination thereof. In general, work vehicle 100 may be powered by a battery, a motor, an internal combustion engine and/or a combination therein.

Traction alternator 108 may be configured to supply electrical power having a controlled voltage and frequency to wheel motors 110, to provide motor torque and speed for wheel motors 110. In some examples, traction alternator 108 may be configured to convert mechanical energy from engine 106 into AC current. The AC current may be sent from traction alternator 108 to control cabinet 112 (e.g., for conversion to DC current, such as via one or more rectifiers).

Wheel motors 110 may be configured to drive respective wheels 116 during operation of work vehicle 100.

In general, control cabinet 112 may be configured to control inverters and motors (such as wheel motors 110) and any other vehicle components that control operation of work vehicle 100. In some examples, control cabinet 112 may convert AC power into electrical power at any desired frequency, and may provide electric power to wheel motors 110. In some examples, control cabinet 112 may include one or more of rectifiers, inverters, switches, power transformers, logic controllers and any other suitable control devices.

Dynamic retarding grid 114 may be configured to dissipate energy from wheel motors 110 during braking action. To slow work vehicle 100 that is moving, drive system 102 may operate in a retard mode (e.g., a braking mode). Under normal operation, wheel motors 110 may converts electrical energy into mechanical energy. During the retard mode, wheel motors 110 may become generators, converting mechanical energy into electrical energy. If this electrical energy (e.g., excess energy) is not used (e.g., by cooling system 104), the excess electrical energy may be transferred to dynamic retarding grid 114. For example, the excess electrical energy may be fed into braking chopper circuits (not shown) and then exhausted through dynamic retarding grid 114. In some examples, dynamic retarding grid may include one or more resistors to consume the excess electrical energy. In general, dynamic retarding grid 114 may aid in controlling the speed of work vehicle 100 that is moving down an incline. In some examples, dynamic retarding grid 114 may be considered "dynamic" in that dynamic retarding grid 114 may be used while work vehicle 100 is in motion, and/or may be supplied with variable power from control cabinet 112.

Referring next to FIG. 2, example cooling system 104 is shown. In particular, FIG. 2 is a perspective view of cooling system 104 of drive system 102. Cooling system 104 may include plurality of fan assemblies 202 and radiator 214. Fan assemblies 202 may be positioned on first side 224 of cooling system 104 and radiator 214 may be positioned on second side 226 of cooling system 102 (e.g., a side where the airflow may enter).

First side 224 (having fan assemblies 202) may be positioned facing engine 106. Fan assemblies 202 may be configured to rotate in a particular direction and pull air into radiator 214 (such as shown by arrows 318 in FIG. 3C). It is understood that, in some examples, second side 226 (having radiator 214) may be positioned facing engine 106, and fan assemblies 202 may be configured to rotate in a reverse direction to direct air into radiator 214 (e.g., in an opposite direction of arrows 318).

Each fan assembly 202 may be positioned within apertures 234 of mounting shroud 210. Cooling system 104 may include support frame 222 positioned behind shroud 210 for mounting one or more components of each fan assembly 202. In some examples, support frame 222 may be affixed (e.g., via one or more screws, welding and the like) to mounting shroud 210, may be affixed directly to frame 212 and/or a combination thereof. Support frame 222 may include one or more support bars (or other suitable structural elements) configured to mechanically couple fan assemblies 202 to frame 212, without substantially reducing airflow provided by fan assemblies 202 to radiator 214. Although horizontal bars of support frame 222 are shown in FIG. 2, it is understood that any suitable configuration of support frame 222 may be used to mechanically couple fan assemblies 202 to frame 212.

Mounting shroud 210 may be mounted (e.g., via one or more screws, welding and the like) to frame 212 on first side 224. Radiator 214 may be mounted (e.g., via one or more screws, welding and the like) to frame 212 on second side 226.

Each fan assembly 202 may include fan motor 204, fan blades 206 and grille 208. In some examples, grille 208 may be mounted directly to mounting shroud 210. Each fan motor 204 may be electrically coupled to a fan controller (such as fan controller 402 in FIG. 4). The fan controller may be configured to control each fan motor 204 independently and/or according to one or more subset of fans (described further below with respect to FIG. 5). Each fan motor 204 may be configured to control rotation of fan blades 206 according to a fan speed determined by the fan controller. In some examples, fan motor 204 may include an electrically-driven (e.g., frequency driven) motor, which may be driven based on a data communication signal (e.g., via a datalink). In some examples, fan motors 204 may be hydraulically driven.

Cooling system 104 shown in FIG. 2 illustrates six fan assemblies 202 configured in a uniformly distributed arrangement across an area of radiator 214. It is understood that the number of fan assemblies 202 shown in FIG. 2 is a non-limiting example. In general, cooling system 104 may include two or more fan assemblies.

Moreover, although FIG. 2 illustrates a uniform distribution of fan assemblies 202 across an area of radiator 214, it is understood that this distribution is a non-limiting example. In some examples, fan assemblies 202 may be non-uniformly distributed across an area of radiator 214. In some examples, one or more hot spots on radiator 214 may be pre-determined. Fan assemblies 202 may then be positioned on mounting shroud 210 to correspond with the hot spot(s). Thus, in some examples, some regions of radiator 214 may be represented by a higher number and/or more compactly-spaced fan assemblies 202 and other regions of radiator may be represented by a lower number and/or more sparsely distributed fan assemblies 202.

Cooling system 104 may also include first radiator frame portion 216 and second radiator frame portion 220. First radiator frame portion 216 may include high temperature circuit (HTC) inlet 218. Second radiator frame portion 220 may include low temperature circuit (LTC) inlet 228, HTC outlet 230 and LTC outlet 232. Radiator 214 may further include an aftercooler (AC) core (e.g., AC core 312 shown in FIGS. 3A-3C) and a jacket water (JW) core (e.g., JW core 314 shown in FIGS. 3A-3C).

Referring to FIGS. 3A-3C, together with FIG. 2, example cooling system 300 is shown. Cooling system 300 illustrates exemplary components and cooling fluid flow through radiator 310. In some configurations, radiator 310 represents an example of radiator 214.

In particular, FIGS. 3A and 3B are perspective views of a portion of cooling system 300, illustrating flow of a cooling fluid through respective AC core 312 and JW core 314; and FIG. 3C is a cross section of cooling system 300 (including fan 308). Cooling system 300 is similar to cooling system 104, in that fan 308 is positioned in aperture 306 of mounting shroud 304, and mounting shroud 304 together with fan 308 is mounted to frame 302 (e.g., on a first side) of cooling system 300. Radiator 310 is mounted to frame 302 (e.g., on a second side of cooling system 300). To better illustrate fluid flow through radiator 310, however, only one fan 308 and one aperture 306 in mounting shroud 304 is shown in cooling system 300.

In general, radiator 310 may be configured to receive a cooling fluid (e.g., water, engine coolant and the like), and direct the fluid though tubes 316 of radiator 310. In one non-limiting example, the cooling fluid may include an ethylene glycol coolant. Synchronous with radiator operation, fan 308 (or fan assemblies 202) may direct air across radiator 310, as shown by arrows 318. In this manner, the cooling fluid may be cooled by the airflow as it passes through tubes 316 of radiator 310. In example radiator 310, two separate, stacked cores are provided, AC core 312 and JW core 314. Both AC core 312 and JW core 314 may be used to cool engine 106. In some examples, AC core 312 may be used for cooling the air entering a combustion chamber of engine 106 (e.g., to increase combustion efficiency). In some examples, JW core 314 may be used for cooling an engine block of engine 106 (e.g., to dissipate heat created by combustion). In some examples, AC core 312 and JW core 314 may represent independent circuits. It is understood that radiator 310 having two cores (312, 314) represents a non-limiting example configuration of radiator 310. In general, radiator 310 may include one or more radiator cores in any suitable serial and/or parallel configuration for cooling at least one cooling fluid. In general, radiator 310 may be configured as to cool jacket water (JW), aftercooler (AC), oil cooler, and any other suitable coolant.

As shown in FIGS. 2 and 3B, HTC inlet 218 may be configured to receive the cooling fluid (from engine 106) and direct the cooling fluid to JW core 314. The cooling fluid may be circulated through the tubes of JW core 314, where it may be cooled during its passage and by airflow from fan 308 (or fan assemblies 202). The cooling fluid may then exit JW core 314 via HTC outlet 230, and may be directed to engine 106 via any suitable fluid connector.

As shown in FIGS. 2 and 3A, LTC inlet 228 may be configured to receive the cooling fluid (from engine 106)

and direct the cooling fluid to AC core 312. The cooling fluid may be circulated through tubes 316 of AC core 312, where it may be cooled during its passage and by airflow from fan 308 (or fan assemblies 202). The cooling fluid may then exit AC core 312 via LTC outlet 232, and may be directed to engine 106 via any suitable fluid connector.

In some configurations, temperature sensors (e.g., temperature sensors 406 shown in FIG. 4) may be positioned in each of HTC inlet 218, LTC inlet 228, HTC outlet 230 and LTC outlet 232. The temperature sensors may be configured to measure a temperature of the cooling fluid at each of these locations. Data from the temperature sensors may be used to determine an optimized targeted airflow for individual and/or subsets of fan assemblies 202.

Referring next to FIG. 4, a functional block diagram of example adaptive cooling system 400 is shown. Adaptive cooling system 400 may include fan controller 4023, engine electric control module (ECM) 404, temperature sensors 406, inverters 408, fan motors 410, one or more control cabinet system(s) 412, wheel motors 414, traction alternator 416 and retarding grid 418. As shown in FIG. 4, components 402-418 of adaptive cooling system 400 may be in electrical communication with each other via one or more electrical connectors and/or electronic data connectors.

Fan controller 402 may be configured to communicate with engine ECM 404, temperature sensors 406, inverters 408, fan motors 410 and control cabinet system(s) 412 via one or more data communication signals. The data signals may be transmitted via one of more data connectors according to one or more suitable data communication protocols such as, without being limited to a Society of Automotive Engineers (SAE) J1939 protocol. Fan controller 402 may be configured to receive a fan speed request signal from engine ECM 404. In some examples, the fan speed request signal may include a data communication signal (e.g., via a data-link) to engage/disengage fan motors 410, and which may control the overall fan speed. In some examples, fan controller 402 may be configured to receive temperature data from temperature sensors 406. Fan controller 402 may also determine an operation status of drive system 102 by communicating with control cabinet system(s) 412. In some examples, fan controller 402 may receive other data (e.g., from control cabinet system(s) 412, inverters 408, fan motors 410, etc.) indicative of operation information of one or more components of adaptive cooling system 400 (or drive system 102). The component operation information that is received may be in addition to or, in some examples, exclusive of temperature data from temperature sensors 406.

In some examples, fan controller 402, responsive to at least the received fan speed request signal (from engine ECM 404) and the operating mode (from control cabinet system(s) 412) may be configured to determine whether to control fan motors 410 according to a targeted cooling operation or a pre-cooling operation. In some examples, fan controller 402 may further use the received temperature data (from temperature sensors 406) and/or component operation information to select one of a targeted cooling operation and a pre-cooling operation. In some examples, fan controller 402 may be configured to manipulate the (native engine) fan speed request to reduce engine parasitic and optimize cooling (e.g., by a targeted cooling operation), including when drive system 102 has excess energy (e.g., by a pre-cooling operation).

Fan controller 402 may include, for example, a logic controller, a processor, a microcontroller, a circuit, software and/or other hardware component(s) specially configured to provide adaptive cooling control of fan motors 410, including targeted cooling and pre-cooling operations. Fan controller 402 may also include processing logic that may comprise hardware (e.g., circuitry, dedicated logic, programmable logic, microcode and the like), software (such as instructions run on a processing device), or a combination thereof for performing the fan control operations described herein.

When targeted cooling operation is selected and initiated, fan controller 402 may be configured to adaptively determine the fan speeds for each of fan motors 410 (or subsets of fan motors 410, as described further in FIG. 5) to provide controlled and improved airflow across radiator 214. In general, fan controller 402 may determine independent fan speeds for fan motors 410 (or motor subsets), based on the fan speed request signal, the operating mode and the temperature data (and/or component operation information). In some examples, each fan speed may be determined such that the combination produce a minimum aggregate power consumption. In some examples, fan controller 402 may be configured to provide targeted temperature control of any hot spots on radiator 214, by using a specially configured optimization algorithm to determine a minimum power consumption to achieve a desired heat rejection for the operating mode.

Figure 6:
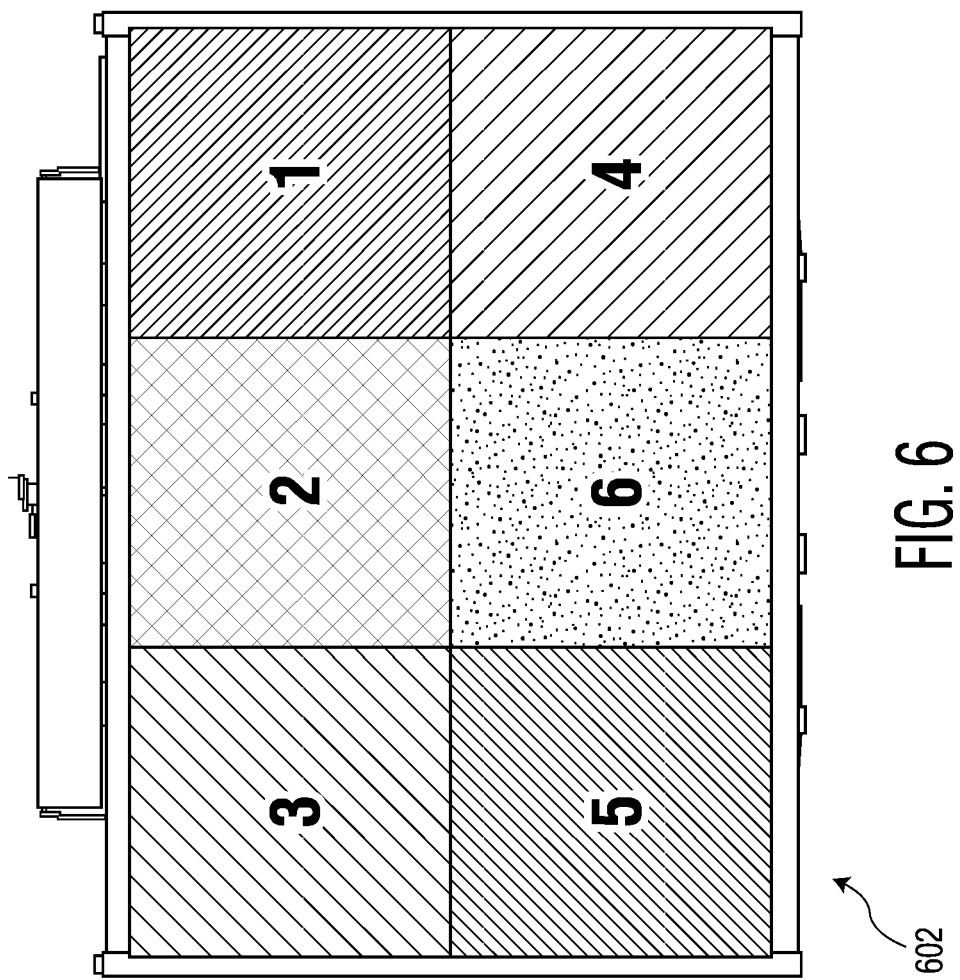
FIG. 6 is a front view of an example cooling system illustrating different airflow intensities assigned to different fans in an array of fans.

Referring to FIG. 6, a front view of example cooling system 104 is shown, illustrating an example of targeted cooling operation. In this example, different, independent fan speeds may be determined for each fan motor 410 (e.g., which may correspond to fan motors 204 of fan assemblies 202 in FIG. 2). The different fan speeds may be assigned to particular ones of fan assembly 202 to generate different airflow intensities 602. In the example shown in FIG. 6, airflow intensities 602 increase in intensity from position 1, position 2, position 3, position 4, position 5 to position 6, with position 1 having a lowest intensity to position 6 having a highest intensity. (Fan positions are indicated as "1," "2," "3," "4," "5" and "6" in FIG. 6.) The different airflow intensities may, in turn, correspond to different temperature areas on radiator 214; with lower airflow intensities corresponding to lower temperature areas and higher airflow intensities corresponding to higher temperature areas. In FIG. 6, position 6 represents a highest temperature area (for a highest airflow intensity), and position 1 represents a lowest temperature area (for a lowest airflow intensity). To maximize the heat rejection, adaptive cooling system 400 may control the fan speeds such that a fastest fan speed is provided in the highest temperature area (such as position 6) compared to the other temperature areas. In this manner, one or more hot spots on radiator that are proximate to positions 4-6 may be assigned higher and/or differing fan speeds, to actively target particular region(s) of radiator 214. It is understood that FIG. 6 represents a non-limiting example of fan speed assignment for targeted cooling operation, and that fan speed assignment may depend at least on the particular configuration of cooling system 104 and operating mode.

As discussed above, in some examples, an optimization algorithm may be configured to determine a minimum power consumption to achieve a desired heat rejection and provide targeted cooling of any hot spots of radiator 214. In some examples, any hot spots on radiator 214 may be predetermined through initial testing of radiator 214, prior to operation of adaptive cooling system 400. In addition, relationships between power consumption and heat rejection for each fan motor 410 may also be predetermined (prior to operation of adaptive cooling system 400), through initial testing of cooling system 104.

Regarding radiator hot spot determination, the temperature of the cooling fluid entering into radiator 214 and the temperature of the cooling fluid exiting from radiator 214 may be measured through initial testing. For the dual core radiator 214 shown in FIGS. 2 and 3A-3C, the entrance and exit temperature may be measured for each core, for example, by temperature sensors positioned in HTC inlet 218, LTC inlet 228, HTC outlet 230 and LTC outlet 232. The inlet and outlet temperatures of radiator 214 may be measured over a plurality of ambient temperatures. Any hot spots may then be determined based on the inlet and outlet temperatures (e.g., for all radiator cores) and the ambient temperature, because cooling fluid flow within radiator 214 and heat rejection performance of radiator 414 are generally predictable.

Regarding relationships between power consumption and heat rejection, in some examples, plural sets of fan curves providing fan power consumption as a function of heat rejection may be predetermined via initial testing, with each set corresponding to different input conditions. The input conditions for each fan curve set may include, without being limited to, inlet cooling fluid temperature(s) (e.g., temperatures at HTC inlet 218 and/or LTC inlet 228), outlet cooling fluid temperature(s) (e.g., temperatures at HTC outlet 230 and LTC outlet 232) and ambient temperature. Each fan curve set may include measured fan consumption power as a function of heat rejection for each individual fan motor 410 of fan assemblies 202. For example, FIG. 7 illustrates an example set of curves of individual fan power consumption as a function of heat rejection for a set of six fans, for particular input conditions.

In operation, the set of fan curves and fan speeds may change depending on radiator inlet and outlet temperatures as well as ambient temperature. For targeted cooling, fan controller 402, responsive to a fan speed request signal (from engine ECM 404), may select a fan curve set among the predetermined fan curve sets, based on the ambient temperature and the radiator inlet and outlet temperatures. Next, the control algorithm of fan controller 402 may determine a minimum aggregate power consumption for all fan motors 410 to achieve a desired heat rejection, and determine a target airflow for each fan assembly 202. In some examples, the control algorithm may use a well-known non-linear control technique to determine an improved aggregate power consumption for the desired heat rejection. In other examples, the control algorithm may use a well-known linear control technique.

Fan controller 402 may then determine individual fan speeds of each fan motor 410 based on well-known fan affinity laws, which relate fan power (e.g., horsepower (HP)) to fan speed (e.g., revolutions per minute (RPM)). Fan controller 402 may communicate the determined fan speeds to corresponding inverters 408 (e.g., via one or more data communication signals). Inverters 408 may control the frequency of power supplied to corresponding fan motors 410 according to the respective fan speeds. During targeted cooling operation, power supplied to fan motors 410 may be obtained from traction alternator 416 (via control cabinet system(s) 412) (or any other suitable power source such as a power supply device and/or a storage device). In this manner, fan assemblies 202 may be individually and adaptively adjusted to provide targeted cooling of radiator 214 with minimal aggregate power consumption.

The control algorithm for targeted cooling is described further below with respect to FIG. 10.

When pre-cooling operation is selected and initiated, fan controller 402 may be configured to use regeneration energy within drive system 102 to drive fan motors 410, thereby incorporating regeneration energy into operation of fan motors 410. In some examples, fan controller 402 may be configured to use regeneration energy to operate fan motors 410 during a predetermined operating mode and/or based on any data from among components of drive system 102 indicating regeneration energy may be available.

In one example, fan controller 402 may determine to initiate pre-cooling operation when it is determined that the operating mode (e.g., received from control cabinet system(s) 412) indicates a retarding mode. During the retarding mode, some of the regeneration energy within drive system 102, such as regeneration energy generated by wheel motors 414 may be routed to inverters 408 rather than to retarding grid 418. For example, fan controller 402 may transmit a data communication message to control cabinet system(s) 412 requesting regeneration energy. Responsive to the request from fan controller 402, one or more switching circuits and (in some examples) one or more rectifying circuits 420 (referred to herein as switch(s)/rectifier(s) 420) of control cabinet system(s) 412 may direct any regeneration energy from wheel motors 414 (after first converting AC power to DC power) to inverters 408 (rather than to retarding grid 418).

Once the operating mode changes from retard mode to another (e.g., normal) operating mode (and/or the regeneration energy is determined to be no longer available), fan controller 402 may send a request to control cabinet system(s) 412 to provide power to inverters 408 from traction alternator 416 or other suitable power source (or, in some examples, to stop providing power to inverters 408). Fan controller 402 may then perform targeted cooling operation using power from traction alternator 416 (or other suitable power source).

During the pre-cooling operation, fan controller 402 may increase all of the fan speeds of fan motors 410 to at least one predetermined value (e.g., a single value such as 100% or two or more different values, such as 50% and 90%) while work vehicle 100 is retarding. This represents "free" energy that would otherwise be exhausted as heat through retarding grid 418. As work vehicle 100 returns to normal operation, the cooling fluid temperature(s) through radiator 214 may be reduced (at the start of normal operation, in a transient mode) and therefore the fan speed(s) may be set lower for a short period of time until work vehicle operation stabilizes again. Accordingly, in some examples, the regeneration energy captured during retard mode may more efficiently power cooling system 104 during a normal operating mode (such as targeted cooling operation). Moreover, pre-cooling operation using regeneration energy may thus save fuel consumption by work vehicle 100, especially in high retarding applications. It is understood that the pre-cooling operation may be performed for any other vehicle operating conditions where regeneration energy may be available, thereby providing additional power saving strategies.

Referring next to FIGS. 8A and 8B, an example of pre-cooling operation is illustrated for retard, transient and normal operating modes. In particular, FIG. 8A is an example diagram illustrating changes in operating mode for an example work vehicle (e.g., work vehicle 100) and FIG. 8B is an example graph illustrating fan speed percentage as a function of time for the changes in operating mode shown in FIG. 8A with pre-cooling and without pre-cooling operation of cooling system 104.

In Segment 1, the work vehicle truck operates in retard mode. During the retard mode, fan controller 402 may increase the fan speed of all fan motors 410 to at least one predetermined speed (e.g., a single speed such as 100%, two or more different speeds, such as 50% and 90%) and may operate all fans with regeneration energy from wheel motors 414. Thus, fan motors 410 may all operate at the predetermined speed(s) without putting an additional load on engine 106. Thus, as shown in Segment 1 of FIG. 8B, the actual fan speeds may be, for example 100%, but the aggregate fan speed is effectively 0% from the perspective of engine 106, because adaptive cooling system 400 uses the energy being created by drive system 102.

In Segment 2, the work vehicle is in a transition mode. In Segment 3, the work vehicle returns to a normal operating mode. During Segment 2, adaptive cooling system 400 may switch to normal cooling operation, using power from traction alternator 416 (or another suitable, different power source) to power fan motors 410. Thus, in the transition mode, engine 106 is now under a load from fan motors 410. However, because system temperatures were lowered during retard mode (during Segment 1), power consumption savings may be made in the transient mode during Segment 2), during the transition from retard operation (Segment 1) to normal operation (Segment 3). For example, FIG. 8B illustrates curve 802 representing the fan speed percentage with pre-cooling operation and curve 804 representing the fan speed percentage without pre-cooling operation (during retard mode). As can be seen in FIG. 8B, both the rate of fan speed increase and the amount of fan speed applied during the transient mode are reduced with pre-cooling (curve 802) with respect to fan operation without pre-cooling (curve 804). Thus, pre-cooling operation (i.e., increased cooling during retard) may reduce the load on engine 106 during the transient mode, thereby providing power consumption and fuel savings.

Examples of pre-cooling operation of fan controller 402 are described further below with respect to FIGS. 9 and 10.

Although not shown in FIG. 4, system 400 may include a storage component such as at least one non-transitory memory, database and the like to store one or more predetermined parameters associated with operation of fans motors 410 during one or more operating modes of drive system 102. Storage may store, without being limited to, one or more sets of fan curves, one or more fan modifiers for targeted cooling operation, one or more predetermined fan speeds for pre-cooling operation, one or more algorithms for determining fan speed, heat rejection, airflow, heat rejection information based on input conditions and the like. The storage may be part of fan controller 402 and/or a separate component.

Engine ECM 404 may be configured to provide fan speed request signals to fan controller 402 via one or more data communication connectors, based on operation of engine 106. Engine ECM 404 may include, for example, a logic controller, a processor, a microcontroller, a circuit, software and/or other hardware component(s) configured to communicate fan speed request messages based on the operation of engine 106.

Temperature sensors 406 may be configured to communicate temperature data associated with radiator 214 to fan controller 402 via one or more data communication connectors. Although plural temperature sensors 406 are described, in some examples, one temperature sensor may be used (e.g., if one of radiator inlet and radiator outlet temperature is a more significant indicator of radiator performance). In some examples, temperature sensors 406 may not be included in adaptive cooling system 400, such as if system 400 does not include targeted cooling operation but rather includes pre-cooling operation and normal operation (e.g., with at least one fan assembly but without independent fan speed control). In one non-limiting example, temperature sensors 406 may include a resistive thermocouple.

Inverters 408 may be configured to receive DC power from control cabinet system(s) 412 (via one or more electrical connectors) and convert the DC power to AC power. Inverters 408 may provide the AC power to fan motors 410 (via one or more electrical connectors). In some examples, inverters 408 may control the frequency of power to each individual fan motor 410 (or fan subsets) to control the rotation of fan motors 410 based on fan speeds determined by fan controller 402. Fan motors 410 are similar to fan motors 204 discussed above with respect to FIG. 2.

Although plural inverters 408 and plural fan motors 410 are described with respect to FIG. 4, in some examples, adaptive cooling system 400 may include one inverter 408 and one fan motor 410, such as if system 400 does not include targeted cooling operation but rather includes pre-cooling operation and normal operation (e.g., with at least one fan assembly but without independent fan speed control). In some examples, the number of inverters 408 may be equal to the number of fan motors 410. In other examples, the number of inverters 408 may be less than the number of fan motors 410, such as when one inverter 408 may drive more than one fan motor (e.g., a subset of fans). An example of fan subset operation is described further below with respect to FIG. 5.

Control cabinet system(s) 412, fan controller 402, inverters 408 and fan motors 410 may be configured to communicate via one or more data communication connectors. Control cabinet system(s) 412 may also be configured to transmit and/or receive one or more AC power from wheel motors 414 via one or more electrical connectors) and to transfer AC power to retarding grid 418. Control cabinet system(s) 712 may also be configured to receive AC power generated by traction alternator 816 (e.g., generated based on engine speed), and to provide DC power to inverters 408. In some examples, control cabinet system(s) 412 may further include switch(s)/rectifier(s) 420 to route (and rectify in some examples) power generated by wheel motors 414 (or any other drive system component) to one of inverters 408 and retarding grid 418. In some examples, switch(s)/rectifier(s) 420 may not be included in adaptive cooling system 400, such as if system 400 does not include pre-cooling operation.

Control cabinet system(s) 412, wheel motors 414, traction alternator 416 and retarding grid 418 are similar to respective control cabinet 112, wheel motors 110, traction alternator 108 and retarding grid 114 described above with respect to FIG. 1.

Although adaptive cooling system 400 shown in FIG. 4 is described with respect to both targeted cooling operation and pre-cooling operation, in some examples, system 400 may include either targeted cooling operation or pre-cooling operation.

For example, in configurations where system 400 includes targeted cooling operation but not pre-cooling operation, system 400 may not direct regeneration energy from wheel motors 414. Thus, in some examples where system 400 include targeted cooling operation (but not pre-cooling), system 400 may not use power generated by wheel motors 414.

In configurations where system 400 includes pre-cooling operation, but not targeted cooling operation, system 400 may not include temperature sensors 406. In some examples, pre-cooling operation may be performed with one or more fan assemblies. For example, pre-cooling operation may be performed with a cooling system having one fan (e.g., as shown in FIGS. 3A-3C). Pre-cooling operation may also be performed with a cooling system having plural fans (e.g., as shown in FIG. 2), where all of the fans are set to at least one predetermined fan speed during both pre-cooling operation and a different single fan speed during normal operation (e.g., using power from traction alternator 416 or any other suitable power source).

Figure 5:
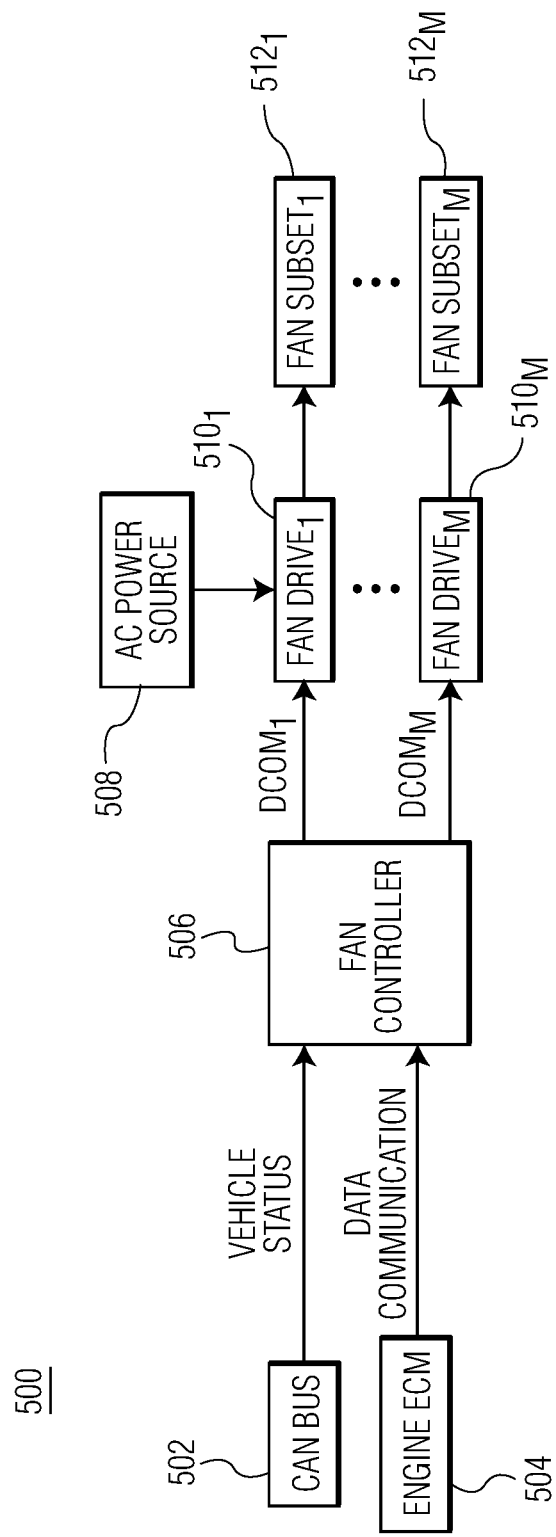
FIG. 5 is a functional block diagram of an example of an adaptive cooling system.

Referring next to FIG. 5, a functional block diagram of example adaptive cooling system 500 is shown. Adaptive cooling system 500 may include fan controller 506, AC power source 508, two or more electric fan drives 510m (designated generally as fan drive(s) 510, where M is greater than or equal to 2) and two or more fan subsets 512m (designated generally as fan subset(s) 512). System 500 is similar to system 400 in that system 500 illustrates an example of targeted cooling with multiple fans using fan controller 506. System 500 also illustrates the use of fan drives 510 to control fan subsets 512, where each fan subset 512 may include one or more fans. System 500 may include one or more additional components shown in FIG. 4 and described above.

Similar to system 400, fan controller 506 may receive vehicle status information, for example, from control cabinet system(s) 412 via controller area network (CAN) bus 502. Fan controller 506 may also receive a fan speed request signal from engine ECM 504. The fan speed request signal may include a data communication signal to control the overall (aggregate) fan speed of all fan subsets 512. Responsive to the vehicle status and fan speed request signal, fan controller 506 may determine independent, targeted fan speeds to apply to each of fan drives 512 (e.g., as described above with respect to FIG. 4). In some examples, fan controller 506 may provide two or more targeted data communication signals (designated $DCOM_1, \ldots, DCOM_M$) to respective fan drives 510, where each targeted data communication signal provided by fan controller 506 may include a different duty cycle to generate the independent, targeted fan speeds. Fan drives 510 may receive the targeted data communication signals together with power from AC power source 508, to operate respective fan subsets 512. In some examples, AC power source 508 may include DC power received from control cabinet system(s) 412 and inverters 408.

Each fan subset 512 may include one or more fans. In some examples, different fan subsets 512 may include different numbers of fans. In some examples, different fan subsets 512 may include a same number of fans. As one example, fan subset 5121 may include two fans, fan subset 5122 may include three fans and fan subset 5123 may include one fan. In another example, each fan subset 512 may include one fan, so that a one-to-one correspondence between a fan drive 510 and fans in a fan subset 512 exist, so that each fan drive 510 provides independent control of each individual fan. In some examples, the grouping of fans into fan subsets 512 and the positioning of fan subsets 512 in cooling system 104 with respect to radiator 214 may depend any desired arrangement, including for hot spot reduction.

Selected portions of this disclosure describe examples and configurations in terms of algorithms and symbolic representations of operations on information. These algorithmic descriptions and representations are used to convey the substance of this disclosure effectively to those skilled in the art. These operations, while described functionally, computationally, or logically, are to be understood as being implemented by data structures, computer programs or equivalent electrical circuits, microcode, or the like. Furthermore, at times, it may be convenient to refer to these arrangements of operations as modules or algorithms. The described operations and their associated modules may be embodied in specialized software, firmware, specially-configured hardware or any combinations thereof.

Figure 9:
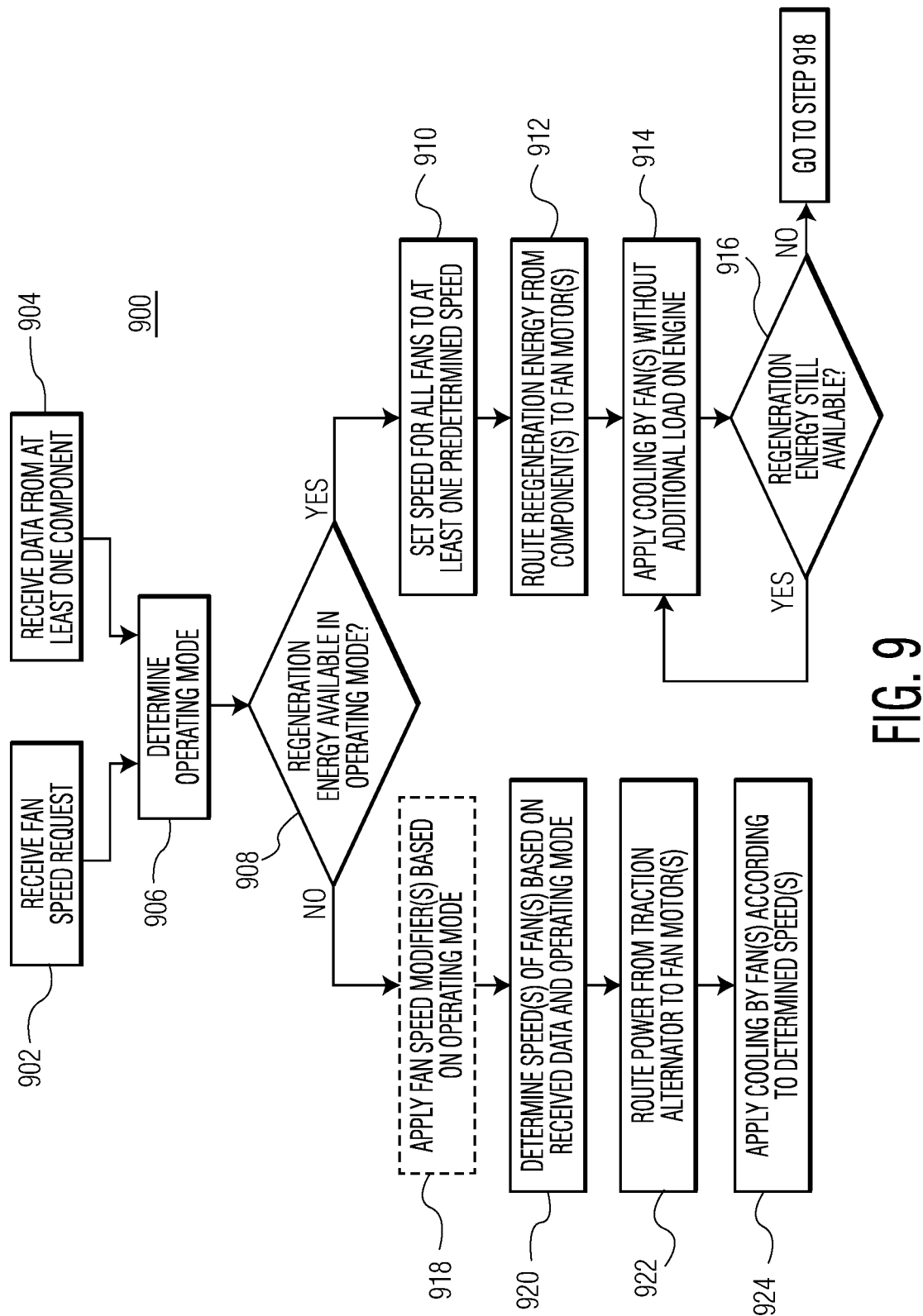
FIG. 9 is a flow chart diagram illustrating an example of a method of regenerative cooling of a cooling system including one or more fans.
Figure 10:
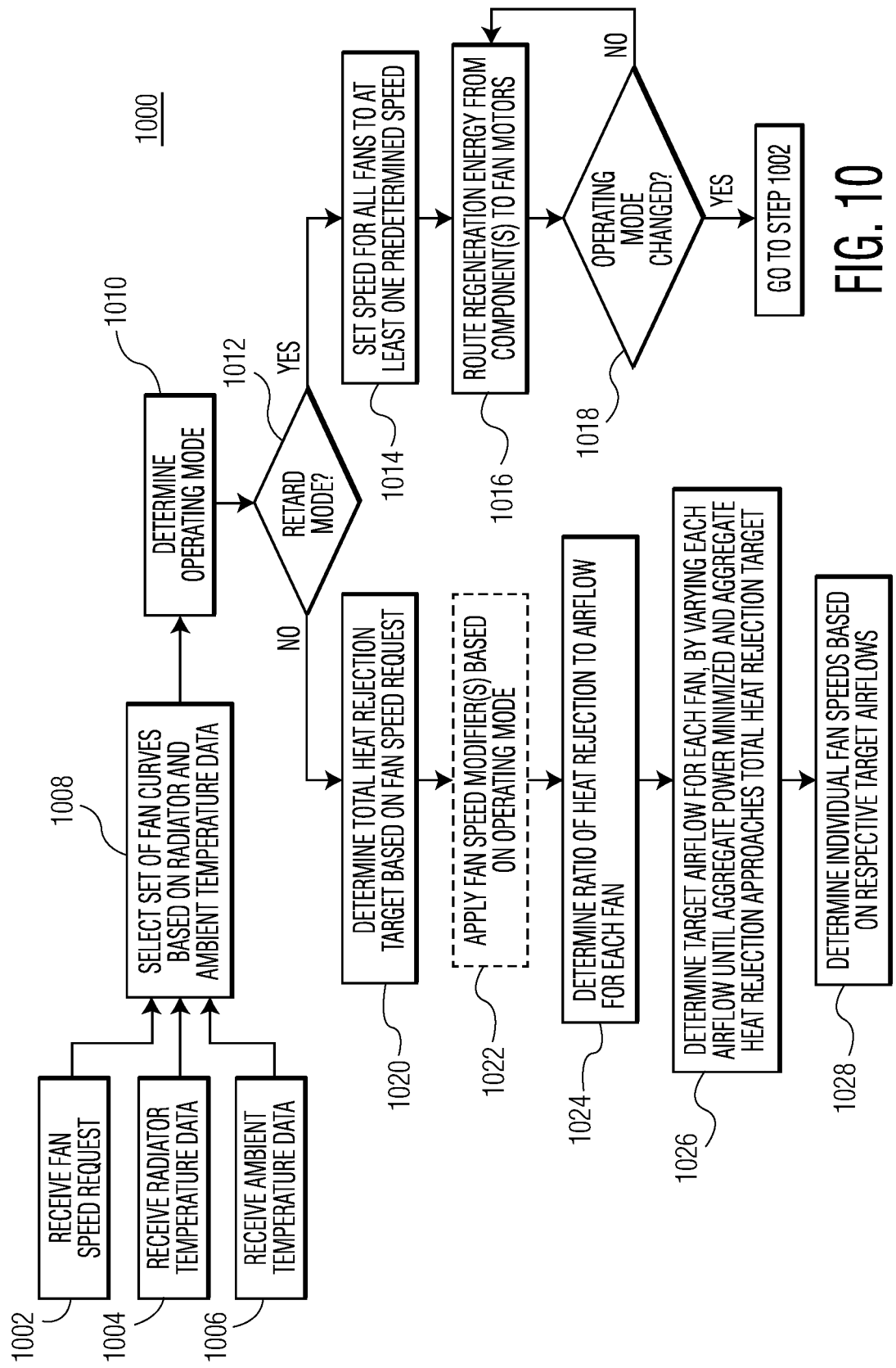
FIG. 10 is a flow chart diagram illustrating an example of a method of adaptive cooling of a multi-fan cooling system.

Adaptive cooling systems 400 and 500 may be configured with more or fewer components to conduct the methods described herein with reference to FIGS. 9 and 10. In particular, FIG. 9 is a flow chart diagram illustrating an example method for regenerative cooling of a cooling system including one or more fans; and FIG. 10 is a flow chart diagram illustrating an example method for adaptive cooling of a multi-fan cooling system. As illustrated in FIGS. 9 and 10, the methods shown may be performed by processing logic that may comprise hardware (e.g., circuitry, dedicated logic, programmable logic, microcode and the like), software (such as instructions run on a processing device), or a combination thereof. In one example, the methods shown in FIGS. 9 and 10 may be performed by one or more components of adaptive cooling system 400 of FIG. 4 and cooling system 104 of FIG. 2 (or cooling system 300 of FIGS. 3A-3C, in some examples) of work vehicle 100. With respect to FIGS. 9 and 10, although these flowcharts may illustrate a specific order of method steps, it is understood that the illustrated methods are exemplary, and that the order of these steps may differ. Also, in some examples, two or more steps may be performed concurrently or with partial concurrence.

Referring to FIG. 9, a flow chart diagram is shown illustrating an example method 900 for regenerative cooling of cooling system 104 (having multiple fans) or cooling system 300 having a single fan. At step 902, fan controller 402 may receive a fan speed request from engine ECM 404 of engine 106. In some examples, fan controller 402 may not receive a fan speed request. Instead, fan controller 402 may be configured to determine the fan speed based on at least one of cooling fluid temperature, engine load or engine speed. At step 904, fan controller 402 may receive data from at least one component of drive system 102 and/or adaptive cooling system 400. For example, the data may include temperature data from one or more temperature sensors 406, data from other components of drive system 102 indicative of regeneration energy availability, and the like. At step 906, fan controller 402 may determine an operating mode of drive system 102. For example, fan controller 402 may obtain the current operating mode from control cabinet system(s) 412 and/or may determine the operating mode from the received component data (step 904).

At step 908, fan controller 402 may determine whether any regeneration energy may be available in the operating mode (determined at step 906). In some examples, the operating mode itself may be used to indicate the availability of regeneration energy (e.g., such as a retarding mode operation) among components of adaptive cooling system 400. In some examples, the received component data (at step 904) may be used to determine the availability of regeneration energy. In some examples, a combination of operating mode and received component data may be used to determine the availability of regeneration energy. In some examples, the availability of regeneration energy may be based on data from one or more sensors, engine load, inclination sensor data, etc.

When it is determined, at step 908, that regeneration energy is available, step 908 may proceed to step 910. At step 910, fan controller 402 may set a speed for all fans (e.g., multiple fans as in cooling system 104 shown in FIG. 2 or a single fan 308 as in cooling system 300 shown in FIGS. 3A-3C) to at least one predetermined speed. In some examples, the predetermined speed(s) may include one predetermined speed, such as a maximum speed (e.g., 100%) or a speed that is less than a maximum speed (e.g. 90%) that is applied to all fans (e.g., one or more fans). In some examples, the predetermined speed may include two or more predetermined speeds (e.g., 50% and 90%) that may be applied to two or more fans (or fan subsets).

At step 912, regeneration energy may be routed from any components that may generate the regeneration energy to one or more fan motors 410 of the one or more fans. For example, during retard mode, regeneration energy from wheel motors 414 may be routed (and in some examples rectified) by switch(s)/rectifier(s) 420 of control cabinet system(s) 412 to inverter(s) 408 and to fan motor(s) 410 of one or more fans. At step 914, adaptive cooling system 400 may apply cooling by the fan(s) using the regeneration energy, according to the predetermined fan speed(s), without an additional load on engine 106.

At step 916, it is determined whether regeneration energy is still available. For example, fan controller 402 may determine the availability based on the current operating mode, based on component data and/or a combination therein. When it is determined that regeneration energy is still available, step 916 may proceed to step 914. When it is determined that regeneration energy is no longer available, step 916 may proceed to step 918 (or, in some examples, to step 902).

When it is determined, at step 908, that regeneration energy is not available, step 908 may proceed to optional step 918. At optional step 918, fan controller 402 may apply one or more fan speed modifiers based on the current operating mode (determined at step 906). For example, different fan speed modifiers may be applied for an idle operating mode, a transient operating mode, a rated operating mode and/or a normal operating mode. At step 920, fan controller 402 may determine at least one speed of fan(s). In some examples, one fan speed may be determined for one fan or multiple fans. In some examples, the fan speed may be determined based on the received fan request (step 902). In some examples, the fan speed may also be based on at least one of the operating mode and the received component data. In some examples, two or more fan speeds for multiple fans may be determined based on the received component data, the operating mode and the fan request. In some examples, the plural fan speeds may be determined to produce a minimum an aggregate power consumption by the plural fans.

At step 922 power from traction alternator 416 (or any other suitable power source that is a different from the source of regeneration energy) may be routed to fan motor(s) 410 of the one or more fan(s). For example, power from traction alternator 416 (or another power source) may be routed to inverter(s) 408 and to fan motor(s) 410 of one or more fans. At step 924, adaptive cooling system 400 may apply cooling by the fan(s) using power from traction alternator 416 (or another power source), according to the determined fan speed(s) (at step 920). Although not shown, steps 902-924 may be repeated during operation of work vehicle 100.

FIG. 10 is a flow chart diagram illustrating an example method 1000 for adaptive cooling of cooling system 104 having multiple fans (e.g., fan assemblies 202 as shown in FIG. 2). At step 1002, fan controller 402 may receive a fan speed request from engine ECM 404 of engine 106. In some examples, fan controller 402 may not receive a fan speed request. Instead, fan controller 402 may be configured to determine the fan speed based on at least one of cooling fluid temperature, engine load or engine speed. In some examples, the fan speed request may include a fan speed value represented as a percentage (e.g. 0%-100%). In some examples, fan controller 402 may determine the fan speed based on the percentage value received in the fan speed request together with the engine speed. For example, 100% airflow at an engine speed of 800 RPM may use less airflow than 100% airflow at an engine speed of 1500 RPM.

At step 1004, fan controller 402 may receive radiator temperature data from among temperature sensors 406. In some examples, the radiator temperature data may include inlet temperatures and/or outlet temperatures of cooling fluid respectively entering and/or exiting radiator 214. In some examples, the inlet temperature data may include temperature data for HTC inlet 218 and LTC inlet 228 (referred to herein as HTC/LTC inlet temperatures). In some examples, the outlet temperature data may include temperature data for HTC outlet 230 and LTC outlet 232 (referred to herein as HTC/LTC outlet temperatures). The inlet and/or outlet temperature data associated with temperatures among HTC/LTC inlet temperatures and HTC/LTC outlet temperatures are referred to herein as HTC/LTC temperatures.

At step 1006, fan controller 402 may receive ambient temperature data from among temperature sensors 406.

At step 1008, fan controller 402 may select a set of predetermined fan curves (e.g., as shown in FIG. 7) from among plural predetermined fan curve sets, based on the radiator and ambient temperature data (received at steps 1004 and 1006). As discussed above, each fan curve set provides a relationship between fan power and heat rejection for each of the fans, where the relationship is associated with particular input conditions (e.g., radiator and ambient temperature conditions). In some examples, the set of predetermined fan curves may be selected based on the HTC/LTC inlet/outlet temperatures and the ambient temperatures. Table 1 below illustrates an example of selecting a fan curve set based on input conditions, using HTC/LTC inlet temperatures. It is understood that Table 1 illustrates one example for selecting a fan curve set, and that other examples may include using HTC/LTC outlet temperatures (only) or HTC/LTC inlet/outlet temperatures. Although the examples provided herein describe using a set of predetermined fan curves for the calculations to determine the individual fan power and individual target heat rejection for each fan, in some examples, fan controller 402 may use data determined in real-time (e.g., rather than using predetermined values in predetermined fan curves), such as based on one or more equations determined via testing of the fans. In some examples, fan controller 402 may use predetermined fan curve sets, together with interpolation and/or extrapolation techniques to determine fan power and heat rejection values for input conditions that are not represented e.g., either completely or in part) in the predetermined fan curve sets.

TABLE 1

Example fan curve selection:

| Input Conditions | Predetermined Fan Curve Sets |
|---|---|
| LTC inlet = A HTC inlet = B Ambient Temperature = A | Select fan curve set "X" |
| LTC inlet = B | Select fan |

TABLE 1-continued

Example fan curve selection:

| Input Conditions | Predetermined Fan Curve Sets |
|---|---|
| HTC inlet = A Ambient Temperature = B | curve set "Y" |

At step 1010, fan controller 402 may determine an operating mode of drive system 102. For example, fan controller 402 may directly obtain the current operating mode from another controller, such as control cabinet system(s) 412. In some examples, fan controller 402 may derive the operating mode from one or more sensors and/or components of drive system 102.

In one embodiment, fan controller 402 may determine whether a retard brake is in operation, to determine that the current operating mode is the retard mode (e.g., representing a combination of steps 1010 and 1012).

At step 1012, fan controller 402 may determine whether the operating mode (determined at step 1010) is a retard mode (or, in some examples other component conditions where regeneration energy may be available). In some examples, fan controller 402 may identify the retard mode directly from the current operating mode information received from another controller. In some examples, fan controller 402 may determine that the operating mode is the retard mode, based on sensor and/or component data of drive system 102, such as retard brake operation and/or inclination sensor data. When it is determined, at step 1012, that the current operating mode is a retard mode (and/or regeneration energy is available), step 1012 may proceed to step 1014.

At step 1014, fan controller 402 may set a speed for all fans to at least one predetermined speed. In some examples, the predetermined speed(s) may include one predetermined speed, such as a maximum speed (e.g., 100%) or a predetermined speed that is less than a maximum speed (e.g., 90%). In some examples, the predetermined speed(s) may include two or more predetermined speeds, such as a first speed (e.g., 50%) for one fan subset (of one or more fans), a second speed (e.g., 90%) for another fan subset (of one or more fans).

At step 1016, regeneration energy may be routed from any components that may generate the regeneration energy to fan motors 410 of the fans. For example, during retard mode, regeneration energy from wheel motors 414 may be routed (and in some examples rectified) by switch(s)/rectifier(s) 420 of control cabinet system(s) 412 to inverter(s) 408 and to fan motor(s) 410 of one or more fans, and adaptive cooling system 400 may apply cooling by the fans using the regeneration energy, according to the predetermined fan speed, without an additional load on engine 106.

At step 1018, it is determined whether the operating mode has changed (e.g., is still in retard mode and/or regeneration energy is still available). When it is determined that the operating mode has not changed (and/or regeneration energy is still available), step 1018 may proceed to step 1016. When it is determined that the operating mode has changed (and/or regeneration energy is no longer available), step 1016 may proceed to step 1002. Although not shown, when step 1018 proceeds to step 1002, power to the fans may be switched from the component that generated regeneration energy to provide power from traction alternator 416 or another power source (e.g., as shown in step 922 shown in FIG. 9).

When it is determined, at step 1012, that the operating mode is not the retard mode (and/or regeneration energy is not available), step 1012 may proceed to step 1020. At step 1020, fan controller 402 may determine a heat rejection target value $HR_T$) based on the fan speed request, as well as a maximum airflow of the plurality of fans (e.g., plural fan assemblies 202). The heat rejection target value $HR_T$ represents a total heat rejection target caused by a total system airflow of the plural fans, when the plural fans (i.e., the combination of fans) generate a total system airflow that meets the fan speed (FS) in the fan speed request. The total system airflow is also referred to as airflow target value ($CFM_T$) further below.

In some examples, the fan speed (FS) in the fan speed request may represent a single, total fan speed percentage to be applied to the plurality of fans (e.g., an overall fan speed percentage). In some examples, the fan speed (FS) in the fan speed request may represent a single, total fan speed value (e.g., X RPM) to be applied to the plurality of fans (e.g., an overall fan speed). In some examples, fan controller 402 may convert a fan speed value (e.g., in RPM) to a percentage.

In general, the total system airflow (i.e., total airflow target value $CFM_T$) for a particular fan speed (FS) may be determined from a predetermined total maximum airflow capable of being produced by the plurality of fans operating at a highest fan speed (e.g., FS=100%) multiplied by the fan speed (e.g., FS=20%, FS=50%, FS=90%, etc.) The total heat rejection target value $HR_T$ (at the particular fan speed, FS), may be determined from the total system airflow as modified by a predetermined radiator coefficient. The predetermined radiator coefficient (A) that is applied may depend on the particular cooling fluid temperature(s) (e.g., determined at step 1004) and/or the particular ambient temperature (e.g., determined at step 1006). The total heat rejection target value $HR_T$ and total airflow target value $CFM_T$ are described further below with respect to equations 1 and 2.

At optional step 1022, fan controller 402 may apply one or more fan speed modifiers based on the current operating mode (determined at step (1010). For example, different fan speed modifiers may be applied for an idle operating mode, a transient operating mode, a rated operating mode and/or a normal operating mode.

At step 1024, fan controller 402 may determine a ratio of heat rejection to airflow value ($C_{Fx}$) for each fan. For example, $C_{F1}$ represents the ratio of heat rejection to airflow value of a first fan (e.g., x=1), $C_{F2}$ represents the ratio of heat rejection to airflow value of a second fan, etc., such that $C_{Fx}$ represents the ratio of heat rejection to airflow value of an xth fan of an N number of fans (where x is an integer greater than or equal to). The ratio of heat rejection to airflow value $C_{Fx}$ is also referred to herein as ratio value. Each ratio value (for fan x) may be predetermined (for example through testing) and may depend on the particular cooling fluid temperature(s) (e.g., determined at step 1004) and/or the particular ambient temperature (e.g., determined at step 1006). In operation, fan controller 402 may select the ratio value $C_{Fx}$ for each fan based on a set of fan curves stored in storage (e.g., memory, database, etc.) based on the particular cooling fluid temperatures(s) and/or the ambient temperature. As one example, the radiator and ambient temperature data may be used to select a particular set of fan curves (such as shown in FIG. 7) and select the ratio value $C_{Fx}$ for each fan. Information in the fan speed request may be used to determine the total heat rejection target value $HR_T$ (step 1020). At step 1026, fan controller 402 may determine a lowest aggregate airflow possible that substantially meets the total heat rejection target value $HR_T$. The fan speed ($RPM_{Fx}$) for fan x may then be determined from among the fan affinity laws show in equations (4) and (5) (or directly from equation (6)). This process may be similarly repeated for all N fans. The ratio of heat rejection to airflow value $C_{Fx}$ is described further below.

For clarity, values relating to overall system level values (for the plurality of fans) are designated by subscript "T." Values relating to individual fans are designated by subscript "Fx" or "F1-N" (i.e., to indicate individual fans among fans 1, N).

At step 1026, fan controller 402 may determine an individual target airflow for each fan ($CFM_{Fx,T}$) to optimize heat rejection and minimize aggregate power consumption, by adjusting individual airflow values $CFM_{Fx}$ of the individual fans. The individual airflow values $CFM_{Fx}$ may be used to determine individual heat rejection values $HR_{Fx}$ (shown in equation (3)) and individual power consumption values $P_{Fx}$ for each fan (shown in equation (6)). Each of the individual heat rejection values and individual power consumption values may be aggregated over all fans to determine respective aggregate heat rejection and aggregate power consumption. Individual airflow values $CFM_{Fx}$ may be adjusted, and the resulting aggregate heat rejection and aggregate power consumption may be compared to a desired total heat rejection (i.e., total heat rejection target value $HR_T$ over all fans) and desired total power consumption (i.e., over all fans). Thus, the individual airflow values $CFM_{Fx}$ may be adjusted until a desired total heat rejection and desired total power consumption are reached. Each individual airflow $CFM_{Fx}$ may be determined similarly to the total target airflow $CFM_T$ shown in equation (1), except that $CFM_{max}$, for the individual airflow, may represent a predetermined total maximum airflow capable of being produced by the particular individual fan operating at a highest fan speed. In some examples, fan controller 402 may determine the target airflow $CFM_T$ based on the fan speed request. Fan controller 402 may then use one or more input sensors to determine which fan curve set to select for the appropriate input conditions. Fan controller 402 may use the selected fan curve set in the optimization method to calculate the lowest fan power value(s) possible to achieve the target airflow, and then send the corresponding fan speed(s) to inverters 408.

In particular, fan controller 402 may vary the individual airflow values $CFM_{Fx}$ for each fan (e.g., vary each of $CFM_{F1-N}$) until an aggregate power (e.g., $P_{Fx}$ for all fans, $\Sigma P_{F1-N}$) is minimized and an aggregate heat rejection (e.g., $HR_{Fx}$ provided by all fans, $\Sigma HR_{F1-N}$) approaches (or, in some examples, substantially equals) the total heat rejection target value $HR_T$ (step 1020). In other words, the optimization algorithm may include:

Varying individual ones of $CFM_{F1-N}$ until $\Sigma P_{F1-N}$ is minimized and $\Sigma HR_{F1-N} = HR_T$.

Any well-known linear programming and/or nonlinear programming control technique may be used to determine the target airflows, to solve the objective function (minimize $P_{F1-N}$ and $HR_{F1-N} = HR_T$) of the algorithm. In one non-limiting example, a nonlinear optimization technique such as the well-known generalized reduced gradient method may be used to determine the target airflows.

In the above optimization, the individual heat rejection values $HR_{Fx}$ may be determined from the respective individual fan speed $RPM_{Fx}$ multiplied by the respective ratio value $C_{Fx}$ (determined at step 1024), as shown in equation (3) below. Alternatively, individual fan speed values $RPM_{Fx}$ may be determined from individual airflow values $CFM_{Fx}$, as shown in equation (4) below and the determined fan speed values may be used in equation (3) to determine the individual heat rejection values $HR_{Fx}$. In general, individual fan operation values (e.g., fan speed values $RPM_{Fx}$ and/or individual airflow values $CFM_{Fx}$) may be selected and used to determine the individual heat rejection values $HR_{Fx}$.

Thus, in operation, fan controller 402 may:
(a) directly select individual fan speed values $RPM_{Fx}$ (or indirectly determine the individual fan speed value $RPM_{Fx}$ after selecting individual airflow values $CFM_{Fx}$) for each fan,
(b) compute the corresponding individual heat rejection values $HR_{Fx}$,
(c) compute a summation of the individual heat rejection values $HR_{Fx}$ ($\Sigma HR_{F1-N}$),
(d) compute a summation of individual power consumption values $P_{Fx}$ (($\Sigma P_{F1-N}$) (e.g., using equation (5) when using individual fan speeds values ($RPM_{Fx}$) or using equation (6) when using individual airflow values ($CFM_{Fx}$), and
(e) determine whether both (i) the summation of heat rejection in step (c) (i.e., the aggregate heat rejection) approaches and/or substantially equals (e.g., within a predetermined threshold) the total target heat rejection value $HR_T$ and (ii) the summation of power consumption in step (d) is minimized (e.g., is less than a predetermined power consumption threshold).

If both summation conditions at step (e) are satisfied, then the optimization may terminate. If both summation conditions at step (e) are not satisfied, one or more individual fan operation values (e.g., individual fan speed values $RPM_{Fx}$ or individual airflow values $CFM_{Fx}$, among fans 1, ..., fan N) may be varied (in step (a)) and steps (b)-(e) may be repeated until both summation conditions are satisfied. The individual airflow values $CFM_{Fx}$ that cause the aggregate heat rejection to approach/substantially equal the total target heat rejection value $HR_T$ from the individual target airflow values $CFM_{Fx,T}$. The individual target airflow values $CFM_{Fx,T}$ may be used in step 1028 to determine individual fan speeds ($RPM_{Fx}$), described further below.

Next, further details on various equations used in the targeted cooling technique are described.

The total airflow target value ($CFM_T$) may be calculated from the fan speed (FS) in the engine fan speed request (step 1002) and a maximum airflow ($CFM_{max}$) of the plurality of fans in cooling system 104. The fan speed request may be provided by engine ECM 404. The total maximum airflow $CFM_{max}$ may be known from well-known fan design parameters. Accordingly, the total airflow target value may be determined as:

$$CFM_T = FS * CFM_{max}. \quad (1)$$

It is assumed that a linear relationship exists between the total system airflow and the heat rejection from that airflow, to classify the total airflow target ($CFM_T$) and total heat rejection target value ($HR_T$). The total heat rejection target value may be determined as:

$$HR_T = A * CFM_T \quad (2)$$

where A is predetermined total radiator coefficient (associated with a total system airflow of the plural fans) that may be determined through testing at different ambient temperatures and/or cooling fluid temperatures.

It is assumed that a linear relationship exists between individual fan speed ($RPM_{Fx}$, e.g., $RPM_{F1-N}$) and individual heat rejection ($HR_{F1-N}$). The individual heat rejection $HR_{Fx}$ for each fan may be determined as:

$$HR_{F1-N} = C_{F1-N} * RPM_{F1-N} \quad (3)$$

where $C_{F1-N}$ is a rank coefficient for each fan that may be determined through testing at different ambient temperatures and/or cooling fluid temperatures.

At step 1028, fan controller 402 may determine individual fan speeds based on the respective individual target airflow values $CFM_{Fx}$ (determined at step 1026). Power from traction alternator 416 (or another power source) may be provided to fan motor(s) 410 of the fans (e.g., via inverters 408), according to the individual fan speed(s). In this manner, adaptive cooling system 400 may apply targeted cooling by the plural fans, based on current operation conditions of work vehicle 100. Although not shown, steps 1002-1028 may be repeated during operation of work vehicle 100.

The individual fan speeds ($RPM_{F1-N}$) (in step 1028) may be determined from the target airflow values ($CFM_{F1-N}$) using the well-known First Fan Affinity Law. The First Fan Affinity Law is shown below as:

$$CFM = CFM_R * \left(\frac{RPM}{RPM_R}\right). \quad (4)$$

In addition, the Third Fan Affinity Law is shown below as:

$$P = P_R * \left(\frac{RPM}{RPM_R}\right)^3. \quad (5)$$

In equations (4) and (5), the subscript "R" in $CFM_R$, $RPM_R$ and $P_R$, refers to a reference value (reference airflow (CFM) value, reference fan speed (RPM) value and reference power (P) value. Reference values $CFM_R$, $RPM_R$, and $P_R$ may be predetermined (e.g., provided by a fan supplier). The reference values (e.g., airflow, power and speed) may be used to calculate information (e.g., airflow, power) at other operating conditions. For example, an airflow (CFM) may be determined, from equation (4), at any known speed (RPM) using the reference airflow value ($CFM_R$) and the reference speed value ($RPM_R$).

Moreover, the First and third fan affinity laws may be used to derive fan power consumption (P) as:

$$P = P_R * \left(\frac{CFM}{CFM_R}\right)^3. \quad (6)$$

Table 2 illustrates an example of determining target airflow and fan speed for each fan.

TABLE 2

Example of target airflow and fan speed determination for six fans (i.e., N = 6).

|  | $C_{Fx}$ | $CFM_{Fx}$ | $HR_{Fx}$ | $P_{Fx}$ | $RPM_{Fx}$ |
|---|---|---|---|---|---|
| Fan 1 | 0.1 | 12000 | 1200 | 3.058017 | 697.8462 |
| Fan 2 | 0.08 | 11500 | 920 | 2.691471 | 668.7692 |
| Fan 3 | 0.06 | 10000 | 600 | 1.769686 | 581.5385 |
| Fan 4 | 0.05 | 9000 | 450 | 1.290101 | 523.3846 |
| Fan 5 | 0.04 | 8000 | 320 | 0.906079 | 465.2308 |
| Fan 6 | 0.03 | 5000 | 150 | 0.221211 | 290.7692 |
| Aggregate | — | 55500 | 3640 | 10.61812 | — |

In Table, 2, the ratio of heat rejection to airflow for each fan ($C_{Fx}$) may be determined from a selected fan curve set (e.g., based on initial testing). The individual target airflows ($CFM_{Fx}$) may vary based on an optimization technique used to solve the objective function described above. Each individual heat rejection value (HR) equals $C_{Fx}*RPM_{Fx}$. The individual fan power consumption ($P_{Fx}$) may be calculated, as derived from Fan Laws 1 and 3. The individual fan speeds ($RPM_{Fx}$) may be determined from Fan Law 1. To determine the individual target airflows $CFM_{Fx}$, the individual heat rejection values ($HR_{Fx}$) desirably sum to the heat rejection target value. The optimization algorithm of fan controller 402 may minimize the sum of the individual fan power consumption values ($P_{Fx}$) such that the aggregate heat rejection approaches the heat rejection target value $HR_T$.

In some examples, method 1000 for adaptive cooling may not include steps 1012-1018 (e.g., method 1000 may include targeted cooling but not pre-cooling). In this example, step 1010 may proceed to step 1020.

While this disclosure has been discussed in terms of representative examples and configurations, it should be appreciated that this disclosure is not so limited. The examples and configurations are explained herein by way of example, and there are numerous modifications, variations and other examples that may be employed that would still be within the scope of the appended claims.

The invention claimed is:

1. A work vehicle cooling system of a work vehicle comprising:
    a plurality of fans configured to provide airflow across a radiator;
    a fan controller in communication with the plurality of fans, the fan controller configured to receive operating condition data associated with at least one of the radiator and an engine, the fan controller configured to:
        determine a total target heat rejection value for the plurality of fans based on the operating condition data;
        determine a plurality of target fan operation values for the plurality of fans, based on the total target heat rejection value and the operating condition data; and
        control operation of the plurality of fans at a plurality of independent fan speeds based on the plurality of target fan operation values, such that all of the plurality of fans are in operation,
    wherein the fan controller is further configured to:
        determine a plurality of individual fan operation values for the plurality of fans based on predetermined fan information corresponding to the operating condition data, and
        adjust one or more among the plurality of individual fan operation values to form the plurality of target fan operation values, such that an aggregate power consumption by the plurality of fans is minimized and an aggregate heat rejection by the plurality of fans approaches the total target heat rejection value.

2. The system of claim 1, the system further comprising at least one temperature sensor configured to determine temperature data of a cooling fluid that at least one of enters and exits the radiator, the operating condition data including the temperature data.

3. The system of claim 2, wherein the operating condition data further includes an ambient temperature.

4. The system of claim 1, wherein the predetermined fan information comprises a predetermined relationship between power consumption and heat rejection for each of the plurality of fans.

5. The system of claim 1, wherein the fan controller is further configured to:
- determine an operating mode of the work vehicle,
- when the operating mode is determined to include a retard mode:
  - set each of the plurality of fans to at least one predetermined fan speed, and
  - operate the plurality of fans with regeneration energy generated by at least one wheel motor according to the at least one predetermined fan speed.

6. The system of claim 5, wherein the fan controller is further configured to:
- determine a change in the operating mode to a further operating mode, and
- operate the plurality of fans with energy generated by a different power source according to the plurality of independent fan speeds in the further operating mode.

7. The system of claim 6, wherein, when the operating mode comprises the retard mode, operation of the plurality of fans during the retard mode reduces a load on the engine by the plurality of fans during a transient mode, the transient mode being between the retard mode and the further operating mode.

8. A work vehicle cooling system of a work vehicle comprising:
- a plurality of fans configured to provide airflow across a radiator;
- a drive system having at least one component configured to generate regeneration energy under one or more vehicle operating modes;
- a control system configured to communicate with the drive system; and
- a fan controller in communication with the plurality of fans, the control system and an engine controller, the fan controller configured to receive operating condition data associated with the radiator and work vehicle operation, and a fan speed request from the engine controller, the fan controller configured to:
  - determine an operating mode of the work vehicle based on the received operating condition data,
  - when the operating mode includes a first mode in which the regeneration energy is available:
    - set the plurality of fans to at least one predetermined fan speed, and
    - operate the plurality of fans with the regeneration energy generated by the at least one component according to the at least one predetermined fan speed, and
  - when the operating mode includes a second mode in which the regeneration energy is unavailable:
    - determine a total target heat rejection value for the plurality of fans based on the received fan speed request,
    - determine a plurality of target fan operation values for the plurality of fans, based on the total target heat rejection value and the operating condition data, and
    - control operation of the plurality of fans at a plurality of independent fan speeds based on the plurality of target fan operation values, such that all of the plurality of fans are in operation,
  - wherein the fan controller, in the second mode, is further configured to:
    - determine a plurality of individual fan operation values for the plurality of fans based on predetermined fan information corresponding to the operating condition data, and
    - adjust one or more among the plurality of individual fan operation values to form the plurality of target fan operation values, such that an aggregate power consumption by the plurality of fans is minimized and an aggregate heat rejection by the plurality of fans approaches the total target heat rejection value.

9. The system of claim 8, wherein the first mode includes a retard mode.

10. The system of claim 8, the system further comprising at least one temperature sensor configured to determine temperature data of one or more of an ambient temperature and a cooling fluid that at least one of enters and exits the radiator, the operating condition data including the temperature data.

11. The system of claim 8, wherein the fan controller is further configured to:
- determine a change in the operating mode from the first mode to the second mode, and
- operate the plurality of fans with energy generated by a different power source according to the plurality of independent fan speeds in the second mode.

12. The system of claim 11, wherein operation of the plurality of fans during the first mode reduces a load on an engine by the plurality of fans during a transient mode between the first mode and the second mode.

13. A work vehicle cooling system comprising:
- a plurality of fans configured to provide airflow across a radiator;
- a drive system having at least one component configured to generate regeneration energy under one or more vehicle operating modes;
- a control system configured to communicate with the drive system; and
- a fan controller in communication with the plurality of fans and the control system, the fan controller configured to receive at least one of operating mode data from the control system and operating condition data associated with the at least one component of the drive system, the fan controller configured to:
  - determine whether the regeneration energy is currently available, based on one or more of the received operating mode data and the received operating condition data,
  - when it is determined that the regeneration energy is currently available:
    - set each of the plurality of fans to at least one predetermined fan speed,
    - operate the plurality of fans with the regeneration energy from the at least one component according to the at least one predetermined fan speed, and
    - operate the plurality of fans with energy from a different power source when a regeneration energy condition changes, the regeneration energy condition comprising at least one of a change in an operating mode and that the regeneration energy becomes unavailable,
  - wherein the fan controller, when the regeneration energy condition changes, is configured to:
  - determine a total target heat rejection value for the plurality of fans based on the operating condition data,
  - determine a plurality of target fan operation values for the plurality of fans, based on the total target heat rejection value and the operating condition data,
  - determine a plurality of individual fan operation values for the plurality of fans based on predetermined fan information corresponding to the operating condition data, and control operation of the plurality of fans at a plurality of independent fan speeds based on the plurality of target fan operation values, such that all of the plurality of fans are in operation, including adjusting one or more among the plurality of individual fan operation values to form the plurality of target fan operation values, such that an aggregate power consumption by the plurality of fans is minimized and an aggregate heat rejection by the plurality of fans approaches the total target heat rejection value.

14. The system of claim 9, wherein operation of the plurality of fans with the regeneration energy is configured to reduce a load on an engine during a transient mode between fan operation with the at least one predetermined fan speed and fan operation with the plurality of independent fan speeds.

15. The system of claim 13, wherein the fan controller determines that the regeneration energy is available based on the operating mode data comprising a retard mode, and the at least one component including regeneration energy comprises one or more wheel motors of the drive system.

16. A work vehicle cooling system comprising:
a plurality of fans configured to provide airflow across a radiator;
a fan controller in communication with the plurality of fans, the fan controller configured to receive operating condition data associated with the radiator, the fan controller configured to:
determine a plurality of target fan operation values for the plurality of fans, based on a total target heat rejection value for the plurality of fans, the operating condition data and predetermined fan information for each fan comprising a relationship between heat rejection and at least one of airflow and fan speed, each target fan operation value comprising at least one of a target airflow value and a target fan speed value;
determine a plurality of individual fan operation values for the plurality of fans based on the predetermined fan information corresponding to the operating condition data; and
control operation of the plurality of fans at a plurality of independent fan speeds based on the plurality of target fan operation values, such that all of the plurality of fans are in operation,
wherein the fan controller is further configured to adjust one or more among the plurality of individual fan operation values to form the plurality of target fan operation values, such that an aggregate power consumption by the plurality of fans is minimized and an aggregate heat rejection by the plurality of fans approaches the total target heat rejection value.

17. A work vehicle cooling system of a work vehicle comprising:
a plurality of fans configured to provide airflow across a radiator;
a drive system having at least one component configured to generate regeneration energy under one or more vehicle operating modes;
a control system configured to communicate with the drive system; and
a fan controller in communication with the plurality of fans and the control system, the fan controller configured to receive operating condition data associated with the radiator and work vehicle operation, the fan controller configured to:
determine an operating mode of the work vehicle based on the received operating condition data,
when the operating mode includes a retard mode:
set each of the plurality of fans to at least one predetermined fan speed, and
operate each of the plurality of fans with the regeneration energy generated by the at least one component according to the at least one predetermined fan speed, and when the operating mode changes from the retard mode to a further operating mode:
operate the plurality of fans with energy generated by a different power source according to a plurality of independent fan speeds in the further operating mode,
wherein the fan controller, in the further operating mode, is configured to:
determine a total target heat rejection value for the plurality of fans based on the operating condition data,
determine a plurality of target fan operation values for the plurality of fans, based on the total target heat rejection value and the operating condition data,
determine a plurality of individual fan operation values for the plurality of fans based on predetermined fan information corresponding to the operating condition data, and
control operation of the plurality of fans at the plurality of independent fan speeds based on the plurality of target fan operation values, such that all of the plurality of fans are in operation, including adjusting one or more among the plurality of individual fan operation values to form the plurality of target fan operation values, such that an aggregate power consumption by the plurality of fans is minimized and an aggregate heat rejection by the plurality of fans approaches the total target heat rejection value for the plurality of fans based on the further operating mode.

* * * * *